(12) United States Patent
Matsushita et al.

(10) Patent No.: US 11,836,110 B2
(45) Date of Patent: Dec. 5, 2023

(54) STORAGE SYSTEM, COMPUTER SYSTEM, AND CONTROL METHOD

(71) Applicant: Hitachi, Ltd., Tokyo (JP)

(72) Inventors: Takaki Matsushita, Tokyo (JP); Akira Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/692,964

(22) Filed: Mar. 11, 2022

(65) Prior Publication Data
US 2022/0405237 A1    Dec. 22, 2022

(30) Foreign Application Priority Data

Jun. 21, 2021 (JP) ................................ 2021-102223

(51) Int. Cl.
| | |
|---|---|
| *G06F 16/10* | (2019.01) |
| *G06F 16/11* | (2019.01) |
| *G06F 16/188* | (2019.01) |
| *G06F 11/14* | (2006.01) |
| *G06F 16/178* | (2019.01) |

(52) U.S. Cl.
CPC ........ *G06F 16/128* (2019.01); *G06F 11/1451* (2013.01); *G06F 11/1458* (2013.01); *G06F 16/178* (2019.01); *G06F 16/188* (2019.01)

(58) Field of Classification Search
None
See application file for complete search history.

(56) References Cited

U.S. PATENT DOCUMENTS

| | | | | |
|---|---|---|---|---|
| 6,651,075 | B1* | 11/2003 | Kusters | ............... G06F 11/1448 |
| 7,197,665 | B2* | 3/2007 | Goldstein | ........... G06F 11/1451 |
| | | | | 714/E11.123 |
| 2003/0182313 | A1* | 9/2003 | Federwisch | ......... G06F 11/2066 |
| | | | | 714/E11.107 |
| 2004/0163009 | A1* | 8/2004 | Goldstein | ........... G06F 11/1451 |
| | | | | 714/E11.123 |

(Continued)

FOREIGN PATENT DOCUMENTS

| | | |
|---|---|---|
| JP | 2009-146389 A | 7/2009 |
| JP | 2013-011919 A | 1/2013 |
| JP | 2018-129074 A | 8/2018 |

OTHER PUBLICATIONS

Japanese Office Action dated Jul. 4, 2023 for Japanese Patent Application No. 2021-102223.

*Primary Examiner* — Belix M Ortiz Ditren
(74) *Attorney, Agent, or Firm* — Volpe Koenig

(57) ABSTRACT

An object of the invention is to reduce a data transfer amount between storage systems. Provided is a storage system connected to another storage system via a network. The storage system includes a memory, a processor configured to execute a program stored in the memory, and a storage device. By executing the program, the processor provides a virtual volume, generates a plurality of snapshots at different timings for the virtual volume, holds a base snapshot, which is a reference snapshot among the plurality of snapshots, in the storage device, and transmits difference data indicating a difference between a snapshot generated after the base snapshot and a snapshot generated immediately before the snapshot to the other storage system and holds the difference data in the other storage system.

12 Claims, 25 Drawing Sheets

(56) References Cited

U.S. PATENT DOCUMENTS

2006/0174075 A1* 8/2006 Sutoh ................... G06F 3/0611
          711/162
2009/0113153 A1   4/2009 Yamamoto et al.
2011/0238937 A1   9/2011 Murotani et al.

* cited by examiner

FIG. 6

SCHEDULE SETTING — 600

VOLUME#100 — 601

- INITIAL Snapshot ACQUISITION TIME: 22:00 — 602
- ACQUISITION CYCLE: 120 min — 603
- PROTECTION PERIOD: 168 hour — 604
- CLOUD BACKUP: Enable — 605
  - IN-DEVICE Snapshot HOLDING NUMBER: 12 — 606
  - BASE Snapshot CREATION THRESHOLD: 10 GB — 607

FIG. 7

RESTORATION EXECUTION — 700

VOLUME#100 — 701

| SELECTION (702) | Snapshot ID (703) | ACQUISITION TIME (704) | ATTRIBUTE (705) |
|---|---|---|---|
| ☐ | 0 | t0 | BASE |
| ☐ | 1 | t1 | CLOUD |
| ☐ | 2 | t2 | CLOUD |
| ☑ | 3 | t3 | CLOUD |
| ☐ | 4 | t4 | NORMAL |
| ☐ | 5 | t5 | NORMAL |

[Execute] [Cancel]

FIG. 8

| VOLUME ID (800) | INITIAL Snapshot ACQUISITION TIME (801) | ACQUISITION CYCLE [min] (802) | PROTECTION PERIOD [hour] (803) | CLOUD BACKUP [1:Enabled / 0:Disabled] (804) | IN-DEVICE Snapshot HOLDING NUMBER (805) | BASE Snapshot CREATION THRESHOLD [GB] (806) |
|---|---|---|---|---|---|---|
| 100 | 22:00 | 120 | 168 | 1 | 10 | 10 |
| 101 | 0:00 | 240 | 24 | 0 | n/a | n/a |
| 102 | 6:00 | 60 | 12 | 1 | 12 | 1 |
| 103 | 2:00 | 1440 | 720 | 0 | n/a | n/a |
| ... | ... | ... | ... | ... | | ... |

FIG. 9

| Page Number (900) | Pool Volume ID (901) | Start Address (902) | Status [1:Allocated/ 0:Free] (903) | ALLOCATION DESTINATION VIRTUAL Volume ID/Snapshot ID (904) | ALLOCATION DESTINATION Address (905) |
|---|---|---|---|---|---|
| 0 | 0 | 0 | 1 | 100 | 0 |
| 1 | 0 | 100 | 0 | n/a | n/a |
| 2 | 0 | 200 | 1 | 101 | 100 |
| 3 | 1 | 0 | 0 | n/a | n/a |
| 4 | 1 | 100 | 1 | 102 | 100 |
| ... | ... | ... | ... | ... | ... |

FIG. 10

| VIRTUAL Volume ID | Start Address | Status [1:Allocated/ 0:Free] | REFERENCE DESTINATION Address (Pool Page Number) |
|---|---|---|---|
| 0 | 0 | 1 | 0 |
| 0 | 100 | 1 | 2 |
| 0 | 200 | 0 | n/a |
| 0 | 300 | 0 | n/a |
| ... | ... | ... | ... |

FIG. 11

| Snapshot ID | Start Address | Status [1:Allocated/ 0:Free] | REFERENCE DESTINATION Address (Pool Page Number or Cloud Object) |
|---|---|---|---|
| 0 | 0 | 1 | cloud object1 |
| 0 | 100 | 1 | cloud object1 |
| 0 | 200 | 0 | n/a |
| 0 | 300 | 0 | n/a |
| ... | ... | ... | ... |

| Snapshot ID | Start Address | Status [1:Allocated/ 0:Free] | REFERENCE DESTINATION Address (Pool Page Number or Cloud Object) |
|---|---|---|---|
| 1 | 0 | 1 | 0 |
| 1 | 100 | 1 | 3 |
| 1 | 200 | 0 | n/a |
| 1 | 300 | 0 | n/a |
| ... | ... | ... | ... |

FIG. 12

| Volume ID (1200) | Snapshot ID (1201) | Snapshot ACQUISITION TIME (1202) | ATTRIBUTE (1203) |
|---|---|---|---|
| 0 | 0 | t0 | BASE |
| 0 | 1 | t1 | cloud |
| 0 | 2 | t2 | cloud |
| 0 | 3 | t3 | cloud |
| 0 | 4 | t4 | NORMAL |
| 0 | 5 | t5 | NORMAL |
| ... | ... | ... | ... |

FIG. 13

| Snapshot ID (1300) | Start Address (1301) | DIFFERENCE BIT (1302) (1: DIFFERENCE PRESENT/0: NO DIFFERENCE) |
|---|---|---|
| 1 | 0 | 0 |
| 1 | 100 | 1 |
| 1 | 200 | 0 |
| 1 | 300 | 0 |
| ... | ... | ... |

STORAGE SYSTEM, COMPUTER SYSTEM, AND CONTROL METHOD

BACKGROUND OF THE INVENTION

1. Field of the Invention

The present invention relates to a storage system, a computer system, and a control method.

2. Description of the Related Art

A computer system handling large-scale data manages the data using a large-capacity storage system (for example, a cloud storage) provided separately from a host computer. As one of utilization forms of the cloud storage, a storage provided in a data center (hereinafter referred to as on-premises) of a customer controls storage of the data in the cloud storage. That is, the host computer is not conscious of the cloud storage.

JP-A-2018-129074 discloses that "capacity saving for an on-premises storage device and high access performance for the on-premises storage device are achieved, and when there is a failure in on-premises resources, businesses are resumed quickly and accurately using the data on the cloud", and that "the processor provides a first volume, which is a virtual volume, and sets a copy pair of the first volume and a second volume provided by another storage system. Write data to the first volume is transferred to the second volume via a network based on the copy pair. The processor writes a part of data written to the second volume to a memory and writes the data written to the memory to a storage device".

If a snapshot of an on-premises volume is held in the cloud storage rather than on-premises, capacity saving of the on-premises can be achieved. However, in order to upload the snapshot to the cloud storage and to download the snapshot from the cloud storage at the time of restoration, it is necessary to transfer a large amount of data, which causes an increase in line cost and deterioration of recovery time objective (RTO).

SUMMARY OF THE INVENTION

Accordingly, an object of the invention is to reduce a data transfer amount between storage systems.

In order to achieve the above object, one of representative storage systems according to the invention is a storage system connected to another storage system via a network. The storage system includes a memory, a processor configured to execute a program stored in the memory, and a storage device. By executing the program, the processor provides a virtual volume, generates a plurality of snapshots at different timings for the virtual volume, holds a base snapshot, which is a reference snapshot among the plurality of snapshots, in the storage device, and transmits difference data indicating a difference between a snapshot generated after the base snapshot and a snapshot generated immediately before the snapshot to the other storage system and holds the difference data in the other storage system.

One of representative computer systems according to the invention includes a first storage system, and a second storage system connected to the first storage system via a network. The first storage system provides a virtual volume, generates a plurality of snapshots at different timings for the virtual volume, holds a base snapshot, which is a reference snapshot among the plurality of snapshots, and transmits difference data indicating a difference between a snapshot generated after the base snapshot and a snapshot generated immediately before the snapshot to the second storage system and holds the difference data in the second storage system.

One of representative control methods according to the invention is a control method for a first storage system connected to a second storage system via a network. The control method includes a step of providing a virtual volume, a step of generating a plurality of snapshots at different timings for the virtual volume, a step of holding a base snapshot, which is a reference snapshot among the plurality of snapshots, in the first storage system, and a step of transmitting difference data indicating a difference between a snapshot generated after the base snapshot and a snapshot generated immediately before the snapshot to the second storage system and holding the difference data in the second storage system.

According to the invention, the data transfer amount between the storage systems can be reduced. Problems, configurations, and effects other than those described above will become apparent based on the following description of embodiments.

BRIEF DESCRIPTION OF THE DRAWINGS

FIG. 6 is an explanatory diagram of a setting screen of a backup schedule.

FIG. 7 is an explanatory diagram of a restoration execution screen.

FIG. 8 is a specific example of a schedule information table.

FIG. 9 is a specific example of a pool table.

FIG. 10 is a specific example of a virtual volume mapping table.

FIG. 11 is a specific example of a snapshot mapping table.

FIG. 12 is a specific example of a snapshot pair management table.

FIG. 13 is a specific example of a difference bitmap.

DESCRIPTION OF THE PREFERRED EMBODIMENTS

Figure 1:
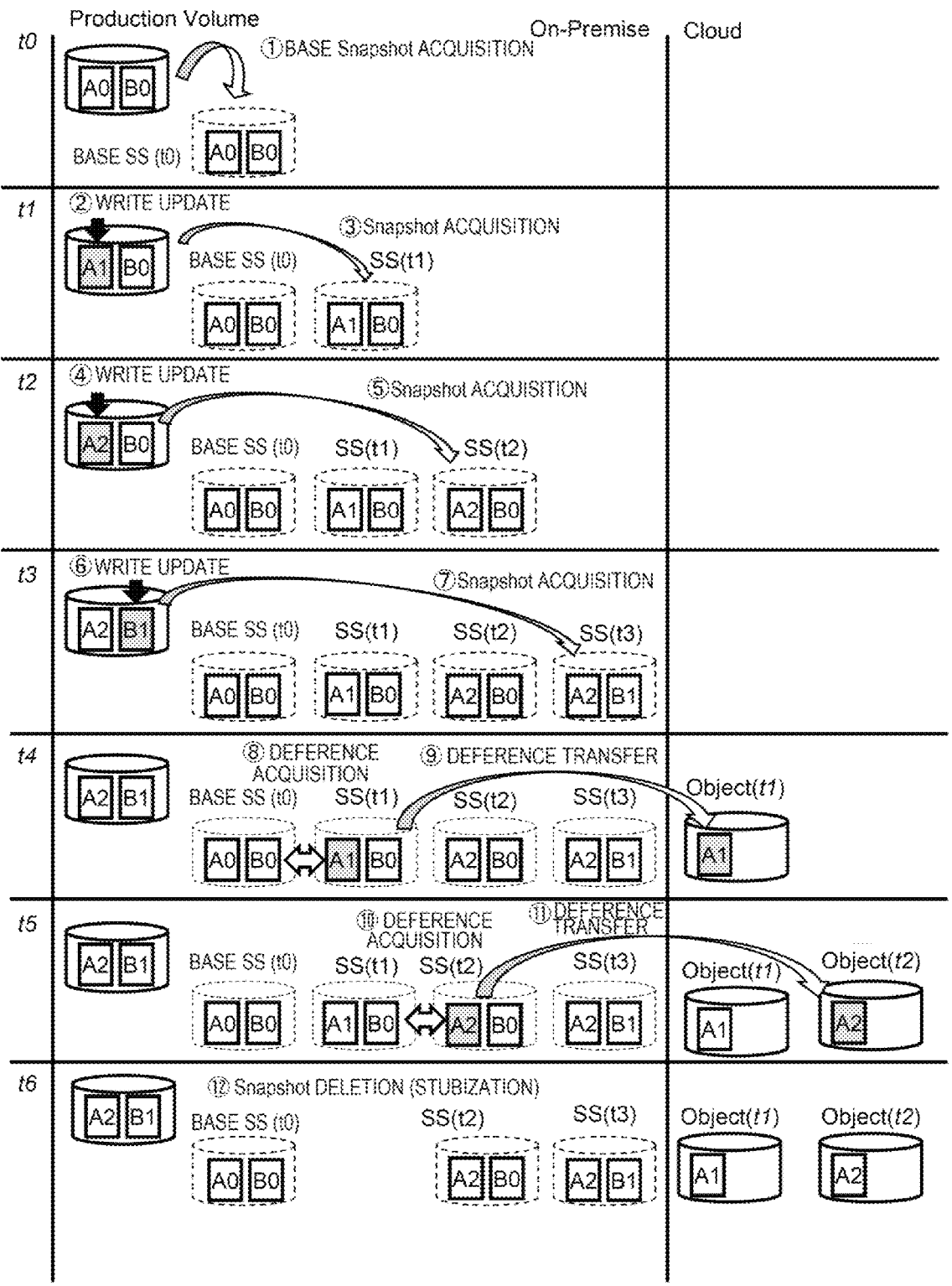
FIG. 1 is an explanatory diagram of difference transfer according to a first embodiment.

Hereinafter, embodiments will be described with reference to the drawings.

In the following description, although information may be described in an expression of an "xxx table", the information may be described in any data structure. That is, in order to indicate that the information does not depend on the data structure, the "xxx table" may be referred to as "xxx information". In the following description, a configuration of each table is an example, one table may be divided into two or more tables, and all or a part of the two or more tables may be one table.

In the following description, an ID is used as identification information of an element, but other types of identification information may be used instead of or in addition to the ID.

In the following description, when the same type of elements are not distinguished from each other, a reference sign numeral or a common number in the reference sign numeral is used, and when the same type of elements are distinguished, the reference sign numeral of the element may be used, or an ID allocated to the element may be used instead of the reference sign numeral.

In the following description, an input/output (I/O) request is a write request or a read request, and may be referred to as an access request.

In the following description, there is a case in which processing is described using a "program" as a subject. Since the program is executed by a processor (for example, a central processing unit (CPU)) to execute determined processing while appropriately using a storage resource (for example, a memory) and/or an interface device (for example, a communication port), the subject of the processing may be the processor. The processing described using the program as a subject may be processing or a system executed by the processor or by a device including the processor. The processor may include a hardware circuit that executes a part or all of the processing. The program may be installed from a program source into a device such as a computer. The program source may be, for example, a program distribution server or a computer readable storage medium. When the program source is the program distribution server, the program distribution server may include the processor (for example, a CPU) and the storage resource, and the storage resource may further store a distribution program and a program to be distributed. The processor of the program distribution server may distribute the program to be distributed to other computers by executing the distribution program. In the following description, two or more programs may be implemented as one program, or one program may be implemented as two or more programs.

First Embodiment

A computer system disclosed in the first embodiment includes a first storage system and a second storage system.

The first storage system is an on-premises storage system provided in a data center of a customer, provides a volume to a host computer, and processes an access request of the host computer. The volume provided by the first storage system to the host computer is referred to as a production volume. The production volume is a virtual volume generated using a physical storage device.

The second storage system is a cloud storage and is used to hold a snapshot of the production volume.

In a case in which the snapshot of the production volume is periodically generated, if all pieces of data related to the snapshot is managed in on-premises, a large amount of capacity is required in an on-premises storage device. On the other hand, if all pieces of the data related to the snapshot is managed in a cloud, a large amount of data transfer is required between the on-premises and the cloud.

Therefore, the computer system according to the first embodiment holds a reference base snapshot in the on-premises storage device, transmits difference data indicating a difference between a snapshot generated after the base snapshot and a snapshot generated immediately before the snapshot to the cloud storage, and holds the difference data in the cloud storage. Therefore, a data transfer amount between storages can be reduced while reducing the capacity required for the on-premises.

FIG. 1 is an explanatory diagram of difference transfer according to the first embodiment. In FIG. 1, the following processing is executed from a time t0 to a time t6.

At the time (t0), the on-premises storage system acquires the base snapshot from the production volume, and holds the base snapshot in the on-premises. The base snapshot is referred to as a base snapshot SS (t0). At the time to, data A0 and data B0 are stored in the production volume, and data A0 and data B0 are included in the base snapshot SS (t0).

At the time (t1), the data A0 of the production volume is updated to data A1. At this point, the on-premises storage system acquires a snapshot SS (t1) from the production volume, and holds the snapshot SS (t1) in the on-premises. Therefore, the base snapshot SS (t0) and the snapshot SS (t1) are held in the on-premises, and the data A1 and the data B0 are included in the snapshot SS (t1).

At the time (t2), the data A1 of the production volume is updated to data A2. At this point, the on-premises storage system acquires a snapshot SS (S2) from the production volume, and holds the snapshot SS (S2) in the on-premises. Therefore, the base snapshot SS (t0), the snapshot SS (t1), and the snapshot SS (t2) are held in the on-premises, and the data A2 and the data B0 are included in the snapshot SS (t2).

At the time (t3), the data B0 of the production volume is updated to data B1. At this point, the on-premises storage system acquires a snapshot SS (S3) from the production volume, and holds the snapshot SS (S3) in the on-premises. Therefore, the base snapshot SS (t0), the snapshot SS (t1), the snapshot SS (t2), and the snapshot SS (t3) are held in the on-premises, and the data A2 and the data B1 are included in the snapshot SS (t3).

At the time (t4), the on-premises storage system acquires a difference between the base snapshot SS (t0) and the snapshot SS (t1), and transfers the difference to the cloud as an object (t1). Therefore, the data A1 is included in the object (t1).

At the time (t5), the on-premises storage system acquires a difference between the latest snapshot SS (t1) that has been subjected to difference transfer and the snapshot SS (t2), and transfers the difference to the cloud as an object (t2). Therefore, the data A2 is included in the object (t2).

At the time (t6), the on-premises storage system leaves the latest snapshot SS (t2) that has been subjected to the difference transfer and the base snapshot SS (t0), and deletes the snapshot SS (t1). When the snapshot is deleted, the data A1 included in the snapshot is deleted from the storage device, but history information of the snapshot is left. In this way, a snapshot in which only the history information is left without data as an entity is referred to as a stub for convenience.

Figure 2:
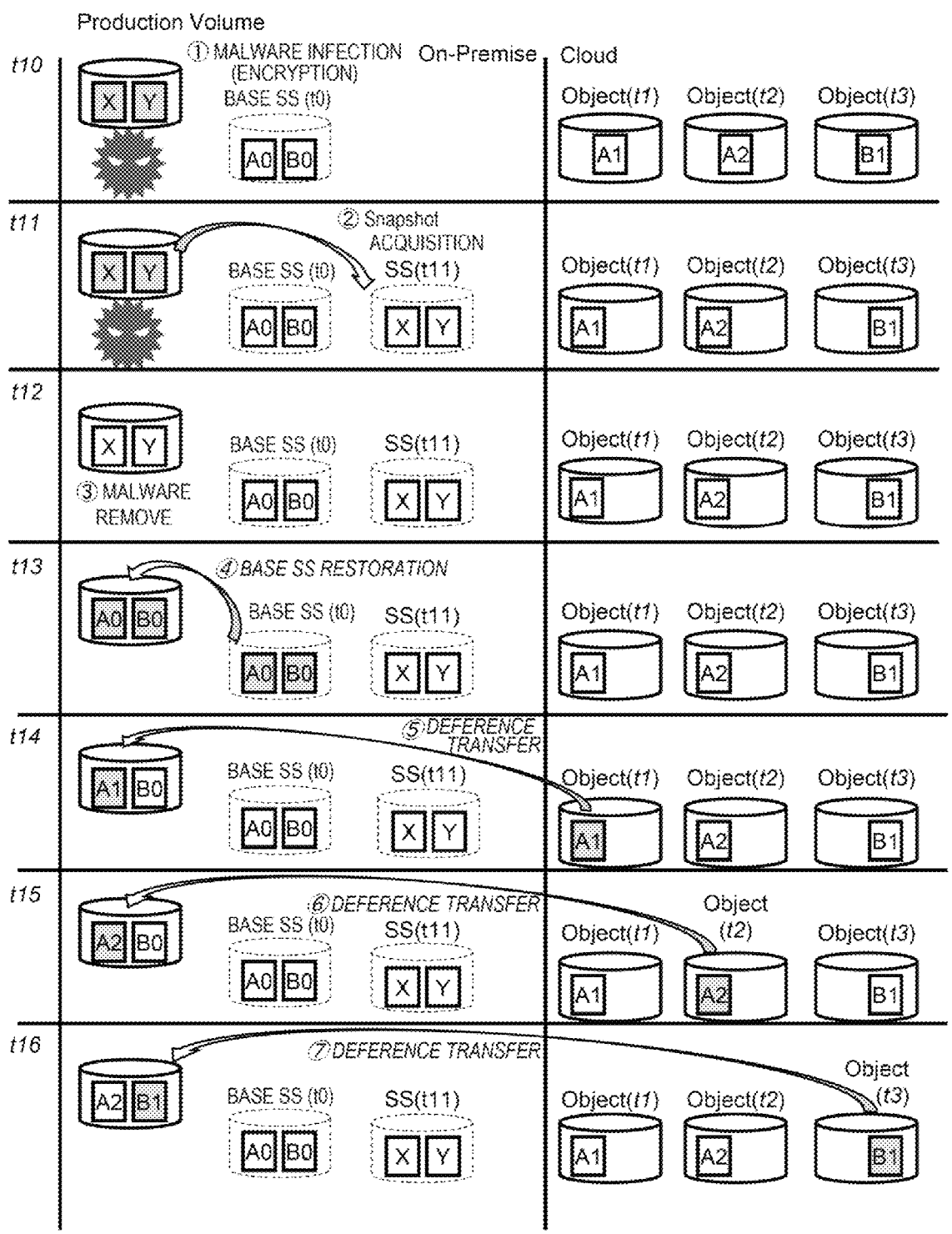
FIG. 2 is an explanatory diagram of restoration according to the first embodiment.

FIG. 2 is an explanatory diagram of restoration according to the first embodiment. In FIG. 2, the following processing is executed from a time t10 to a time t16.

At the time (t10), an abnormality occurs in the data of the production volume. Specifically, the production volume is infected with malware, and the present data is encrypted and replaced with data X and data Y.

At the time (t11), the on-premises storage system acquires a snapshot SS (t11) from the production volume, and holds the snapshot SS (t11) in the on-premises. Therefore, the base snapshot SS (t0) and the snapshot SS (t11) are held in the on-premises, and the data X and the data Y are included in the snapshot SS (t1).

At the time (t12), the on-premises storage system removes the malware from the production volume.

At the time (t13), the on-premises storage system writes the base snapshot SS (t0) back to the production volume. As a result, the data A0 and the data B0 are included in the production volume.

At the time (t14), the on-premises storage system receives difference transfer of the object (t1) from the cloud, and reflects the difference transfer of the object (t1) on the production volume. As a result, the data A1 and the data B0 are included in the production volume.

At the time (t15), the on-premises storage system receives difference transfer of the object (t2) from the cloud, and reflects the difference transfer of the object (t2) on the production volume. As a result, the data A2 and the data B0 are included in the production volume.

At the time (t16), the on-premises storage system receives difference transfer of the object (t3) from the cloud and reflects the difference transfer of the object (t3) on the production volume. As a result, the data A2 and the data B1 are included in the production volume.

In this way, after the base snapshot held in the on-premises has been written back, the restoration of the production volume can be executed by applying a plurality of pieces of difference data in time series.

Figure 3:
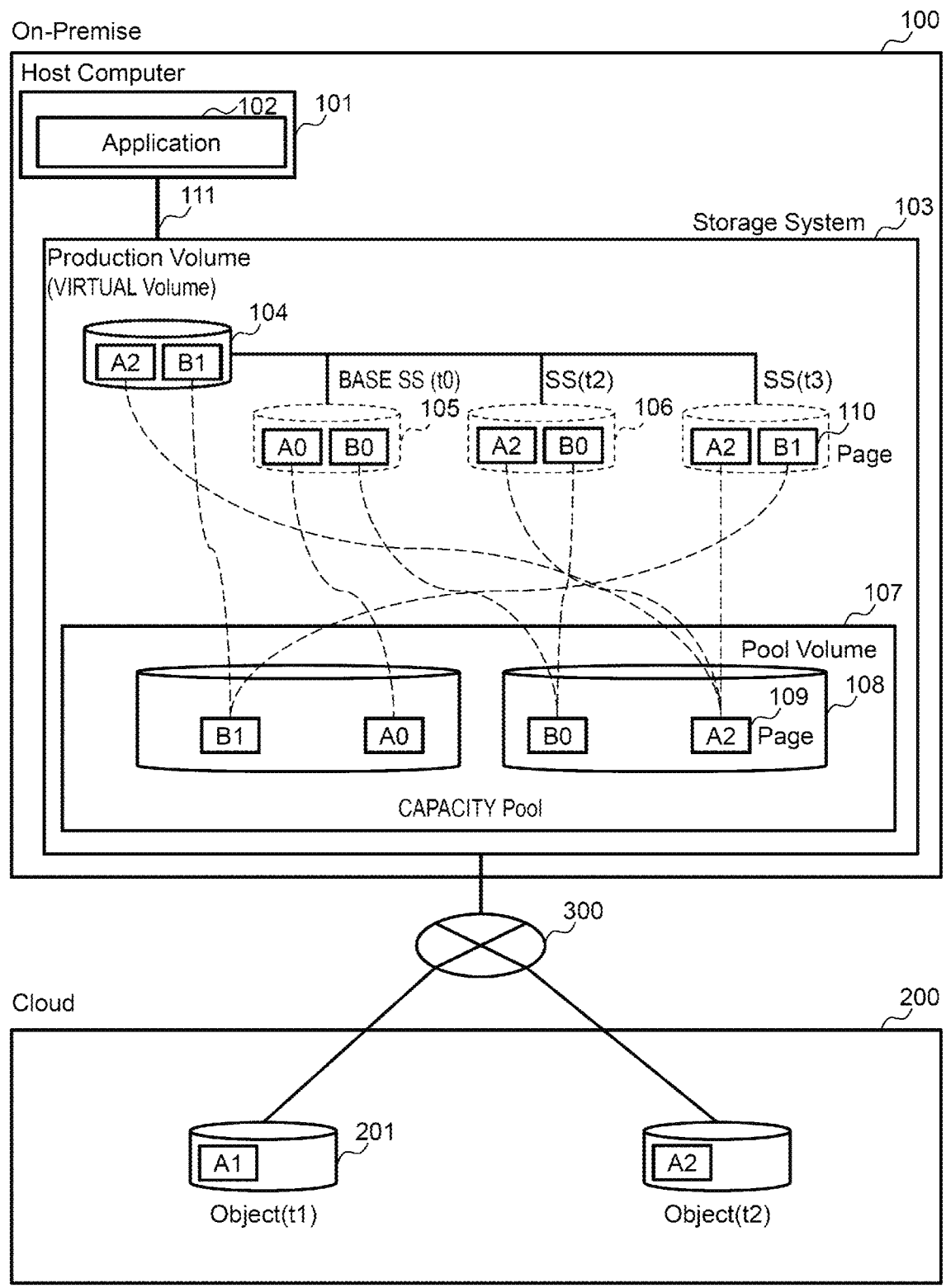
FIG. 3 is a configuration diagram of a computer system according to the first embodiment.

FIG. 3 is a configuration diagram of the computer system according to the first embodiment.

The computer system according to the present embodiment includes on-premises 100 and a cloud 200.

The on-premises 100 includes a storage system 103 and a host computer 101 that stores data in the storage system. The host computer 101 executes an application 102, and data used in the application 102 is stored in the storage system 103. The host computer 101 and the storage system 103 are connected via a network 111. The storage system 103 may be referred to as a storage device.

The cloud 200 provides one or a plurality of object storages 201.

The storage system 103 and the object storage 201 are connected via a network 300.

The storage system 103 uses a physical storage device to form a virtual volume 104 and a capacity pool 107. The capacity pool 107 is associated with a physical storage device such as a hard disk drive (HDD) mounted in the storage system 103, and has a physical capacity.

The virtual volume 104 is a storage region provided to be accessible from the host computer 101. The host computer 101 can handle the virtual volume 104 in the same manner as a normal volume.

When receiving a write request from the host computer 101 to the virtual volume 104, the storage system 103 reserves a region from the capacity pool 107 and associates the region with an address indicated in the write request. The write data itself is stored in the capacity pool. In the present embodiment, storing data in the virtual volume 104 means storing the data in a cache in the storage system 103 as data of the virtual volume 104, or storing the data in the capacity pool 107 corresponding to the virtual volume 104. The physical storage device may be referred to as a storage device.

The storage system 103 creates a pool volume 108 from physical storage regions of a plurality of physical storage devices. The capacity pool 107 includes one or more pool volumes 108. The pool volume 108 includes a page 109. The page 109 is a physical storage region that is an allocation unit to the virtual volume 104. A capacity of the page 109 is, for example, several KB to several tens of MB.

When the data is written in the virtual storage region in the virtual volume 104, the storage system 103 allocates the page 109 in the pool volume 108 to the virtual storage region. That is, the page 109 is not allocated to a region in which the virtual volume 104 is not used.

The storage system 103 periodically creates a snapshot of the virtual volume 104 which is the production volume. The data of the snapshot is also held in the pool volume 108.

In FIG. 3, the virtual volume 104 includes data A2 and data B1, and the base snapshot SS (t0) includes the data A0 and the data B0.

The snapshot SS (t2) includes the data A2 and the data B0, and the snapshot SS (t3) includes the data A2 and the data B1.

The data A2 of the virtual volume 104 and the data A2 of the snapshot SS (t3) are in a state in which the same page in the pool volume 108 is allocated. In this way, since the same page is allocated to the same data in the pool volume 108 and the plurality of snapshots, a capacity of the pool volume 108 is not consumed due to duplication of the data.

In other words, after the snapshot has been generated, when data update of the virtual volume 104 occurs due to the write request, the storage system 103 allocates a new page to the virtual storage region of an update destination, thereby achieving the data update of the virtual volume 104 while protecting the data of the snapshot. If the snapshot becomes a stub, a page used only for the snapshot is released.

Figure 4:
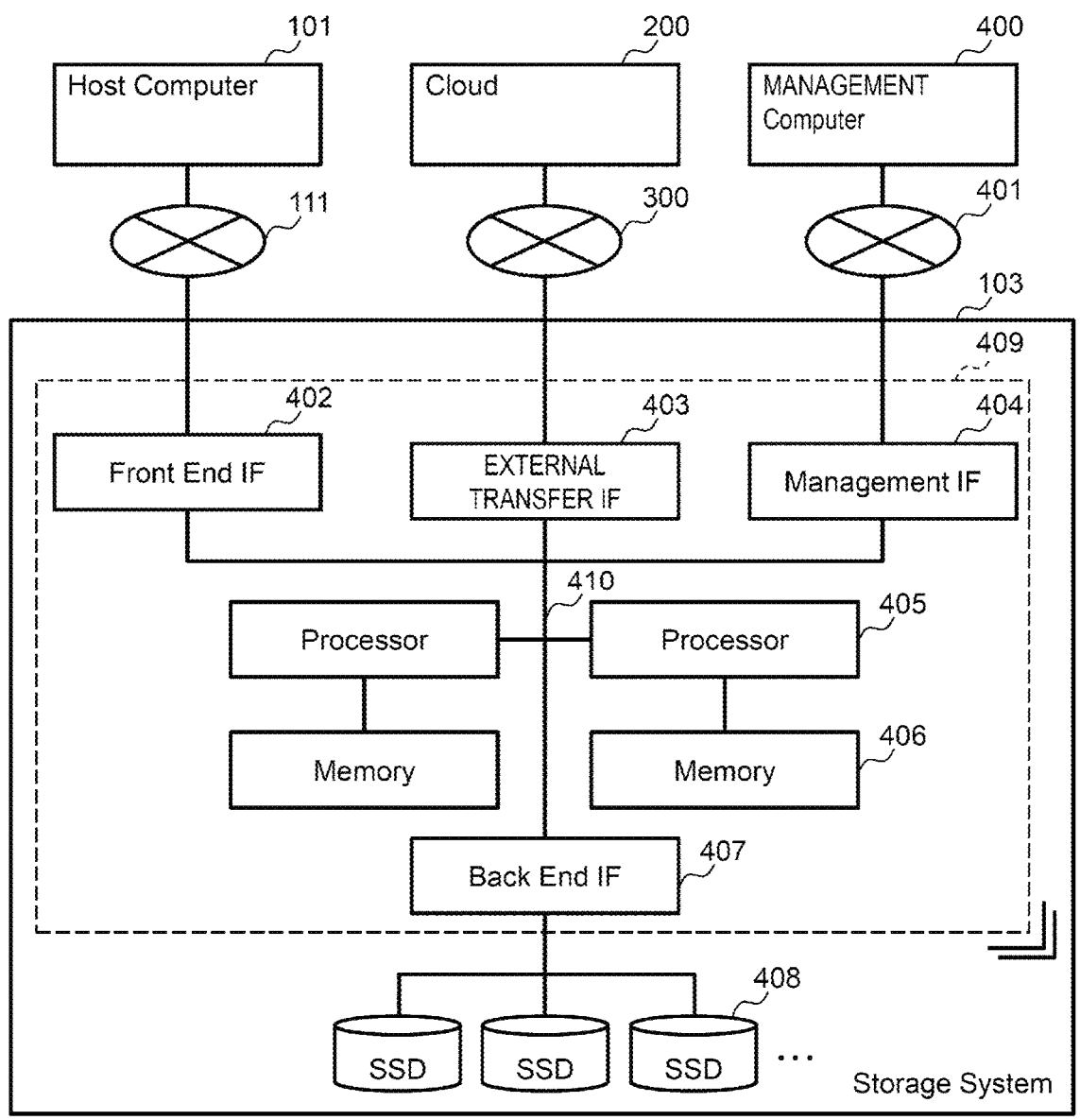
FIG. 4 is a configuration diagram of a storage system.

FIG. 4 is a configuration diagram of the storage system 103.

The storage system 103 includes one or a plurality of controllers 409 and one or a plurality of physical storage devices 408. Any device such as a solid state drive (SSD) may be used as the physical storage device 408.

The controller 409 includes a front end IF 402, an external transfer IF 403, a management IF 404, a processor 405, a memory 406, and a back end IF 407, which are connected by a bus 410.

The front end IF 402 is an interface connected to the host computer 101 via the network 111.

The external transfer IF 403 is an interface connected to the cloud 200 via the network 300.

The management IF 404 is an interface connected to a management computer 400 via a network 401.

The back end IF 407 is an interface connected to the physical storage device 408 in the storage system 103.

The processor 405 achieves various functions by executing programs stored in the memory 406. For example, the processor 405 provides a virtual volume to the host computer 101. The processor 405 generates a plurality of snapshots at different timings for the virtual volume, holds a base snapshot, which is a reference snapshot among the plurality of snapshots, in the physical storage device 408, transmits difference data indicating a difference between the base snapshot and a snapshot generated after the base snapshot to the cloud 200, which is another storage system, and holds the difference data in the cloud 200.

Figure 5:
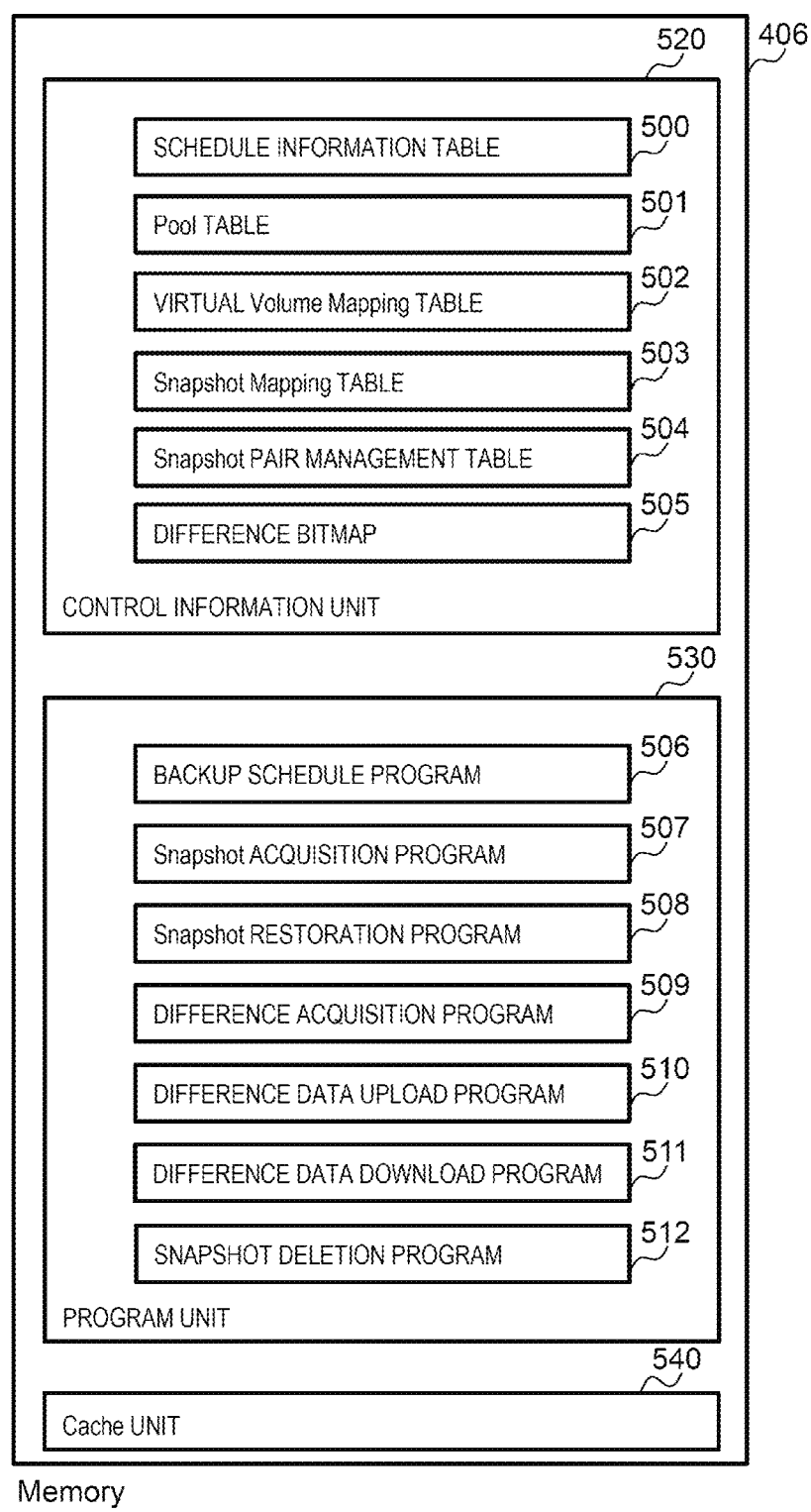
FIG. 5 is an explanatory diagram of data stored in a memory.

FIG. 5 is an explanatory diagram of data stored in the memory 406.

The memory 406 includes, for example, one or more memory devices, and includes a control information unit 520 that stores control information, a program unit 530 that stores a program, and a cache unit 540 as an example of a cache memory that caches data. The cache unit 540 may be referred to as a cache or a cache memory.

The control information unit 520 of the memory 406 stores a schedule information table 500, a pool table 501, a virtual volume mapping table 502, a snapshot mapping table 503, a snapshot pair management table 504, and a difference bitmap 505.

The schedule information table 500 is a table that holds backup schedule setting information (snapshot acquisition cycle and protection period).

The pool table 501 is an address mapping table that holds pointer information from a page in a pool to a logical address of a virtual volume or a snapshot.

The virtual volume mapping table 502 is an address mapping table that holds pointer information from a logical address of the virtual volume to the page in the pool.

The snapshot mapping table 503 is an address mapping table that holds pointer information from a logical address of the snapshot to the page in the pool or a cloud object.

The snapshot pair management table 504 is a table that manages one or more snapshot pairs for each volume.

The difference bitmap 505 is a bitmap table that manages a difference position from a previous generation for each snapshot.

The program unit 530 of the memory 406 stores a backup schedule program 506, a snapshot acquisition program 507, a snapshot restoration program 508, a difference acquisition program 509, a difference data upload program 510, a difference data download program 511, and a snapshot deletion program 512.

The backup schedule program 506 is a program for executing backup processing and snapshot deletion processing based on the schedule setting information.

The snapshot acquisition program 507 is a program for acquiring the snapshot.

The snapshot restoration program 508 is a program for executing data reconstruction (restoration) from the snapshot to the production volume.

The difference acquisition program 509 is a program for acquiring a difference position from a snapshot of the previous generation.

The difference data upload program 510 is a program for uploading a difference data group from the storage device to a cloud object storage.

The difference data download program 511 is a program for downloading the difference data group from the cloud object storage to the storage device.

The snapshot deletion program 512 is a program for deleting the snapshot.

FIG. 6 is an explanatory diagram of a setting screen of a backup schedule. A volume ID 601 on the setting screen is identification information for specifying a virtual volume that sets the backup schedule.

An initial snapshot acquisition time 602 is an input field for designating a time at which the snapshot is first acquired for a target virtual volume.

An acquisition cycle 603 is an input field for designating a cycle for acquiring the snapshot.

A protection period 604 is an input field for designating a protection period of the snapshot.

A cloud backup designation field 605 is an input field for designating whether to transfer the difference data to the cloud storage. If the cloud backup designation field 605 is designated as "Enable", the difference between the snapshot generated after the base snapshot and the snapshot generated immediately before the snapshot can be transferred to the cloud and held in the cloud. If the cloud backup designation field 605 is designated as "Disable", all the snapshots are held in the storage system 103.

When the cloud backup designation field 605 is designated as "Enable", an in-device snapshot holding number designation field 606 and a base snapshot creation threshold designation field 607 can be input.

The in-device snapshot holding number designation field 606 is an input field for designating how many snapshots are to be held in the storage system 103 other than the base snapshot, and transfers snapshots from an old snapshot to the cloud when the number of the snapshots exceeds a designated number.

The base snapshot creation threshold designation field 607 is an input field for designating a condition for updating the base snapshot, and updates the base snapshot when a sum of the difference data from the base snapshot exceeds a threshold.

Even when a cloud backup is "Enable", depending on the acquisition cycle and the protection period, the protection period may elapse and the snapshots may be deleted in the device while the number does not reach an in-device snapshot holding number, that is, the cloud backup may not operate.

For example, if the acquisition cycle is 120 minutes and the protection period is 24 hours, 12 snapshots can be used in the device without cloud backup.

Depending on a base snapshot creation threshold, the old snapshot may be deleted from the device due to the update of the base snapshot even though the in-device snapshot holding number has not been reached.

FIG. 7 is an explanatory diagram of a restoration execution screen. A volume ID 701 in the restoration execution screen is identification information for identifying a virtual volume to be restored.

A selection field 702 is a check box for designating which of snapshots displayed in a list is to be restored.

A snapshot ID 703 is identification information of the snapshot, and an acquisition time 704 indicates a time at which the snapshot is acquired.

An attribute 705 indicates an attribute of the snapshot, and takes values such as "base", "cloud", and "normal". If the attribute 705 is "base", the snapshot is a base snapshot. If the attribute 705 is "cloud", the snapshot has already been transferred to the cloud. If the attribute 705 is "normal", the snapshot is not transferred to the cloud, and all pieces of data are present in the on-premises.

FIG. 8 is a specific example of the schedule information table 500. The schedule information table 500 is a table that manages a backup schedule for each virtual volume, and includes items of a volume ID 800, an initial snapshot acquisition time 801, an acquisition cycle 802, a protection period 803, a cloud backup 804, an in-device snapshot holding number 805, and a base snapshot creation threshold 806. These items hold values input on the setting screen shown in FIG. 6.

FIG. 9 is a specific example of the pool table 501. The pool table 501 includes items of a page number 900, a pool volume ID 901, a start address 902, a status 903, an allocation destination virtual volume ID/snapshot ID 904, and an allocation destination address 905.

Among these items, the status 903 indicates an allocated status (Allocated) or an unallocated status (Free). Then, in a case of the allocated status, an allocation destination is specified by the allocation destination virtual volume ID/snapshot ID 904 and the allocation destination address 905. The allocation destination may be the virtual volume or the snapshot.

FIG. 10 is a specific example of the virtual volume mapping table 502. The virtual volume mapping table 502 includes items of a virtual volume ID 1000, a start address 1001, a status 1002, and a reference destination address 1003.

The status 1002 indicates an allocated status (Allocated) or an unallocated status (Free).

The reference destination address 1003 is specified by a pool page number when the status 1002 indicates the allocated status.

FIG. 11 is a specific example of the snapshot mapping table 503. The snapshot mapping table 503 includes items of a snapshot ID 1100, a start address 1101, a status 1102, and a reference destination address 1103.

The status 1102 indicates an allocated status (Allocated) or an unallocated status (Free).

The reference destination address 1103 is specified by the pool page number or the cloud object when the status 1102 indicates the allocated status.

FIG. 12 is a specific example of the snapshot pair management table 504. The snapshot pair management table 504 includes items of a volume ID 1200, a snapshot ID 1201, a snapshot acquisition time 1202, and an attribute 1203.

FIG. 12 shows a state in which snapshots at the time "t0" to the time "t5" are acquired for the virtual volume having a volume ID "0".

An attribute of a snapshot ID "0" acquired at the time "t0" is "base".

An attribute of a snapshot ID "1" acquired at the time "t1" is "cloud".

An attribute of a snapshot ID "2" acquired at the time "t2" is "cloud".

An attribute of a snapshot ID "3" acquired at the time "t3" is "cloud".

An attribute of a snapshot ID "4" acquired at the time "t4" is "normal".

An attribute of a snapshot ID "5" acquired at the time "t5" is "normal".

FIG. 13 is a specific example of the difference bitmap 505. The difference bitmap 505 includes items of a snapshot ID 1300, a start address 1301, and a difference bit 1302.

The difference bit 1302 indicates that there is a difference from a snapshot acquired immediately before by "1" and that there is no difference from a snapshot acquired immediately before by "0".

Figure 14:
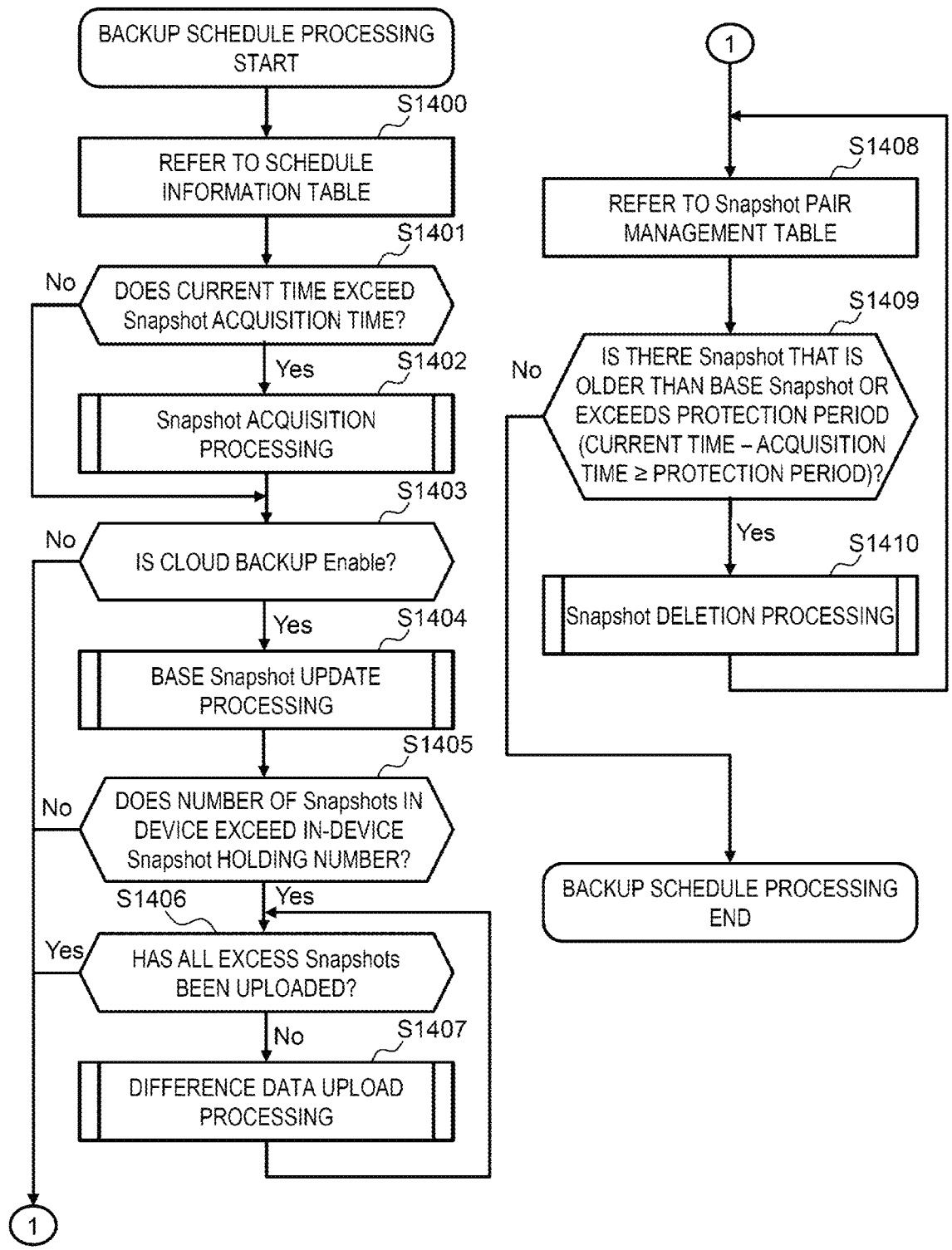
FIG. 14 is a flowchart showing a processing procedure of a backup schedule program.

FIG. 14 is a flowchart showing a processing procedure of a backup schedule program. The backup schedule program 506 first refers to the schedule information table 500 (step 1400), and determines whether a current time exceeds a snapshot acquisition time (step 1401).

If the current time exceeds the snapshot acquisition time (step 1401: Yes), snapshot acquisition processing is started (step 1402). After the snapshot acquisition processing or when the current time does not exceed the snapshot acquisition time (step 1401: No), the backup schedule program 506 determines whether the cloud backup is "Enable" (step 1403).

If the cloud backup is "Enable" (step 1403: Yes), base snapshot update processing is started (step 1404). After the base snapshot update processing, the backup schedule program 506 determines whether the number of the snapshots in the device exceeds the in-device snapshot holding number (step 1405).

If the number of the snapshots in the device exceeds the in-device snapshot holding number (step 1405: Yes), the backup schedule program 506 determines whether all the excess snapshots have been uploaded (step 1406).

If all the excess snapshots have not been uploaded (step 1406: No), difference data upload processing is started (step 1407). After step 1407, the processing returns to step 1406.

If the cloud backup is "Disable" (step 1403: No), when the number of the snapshots in the device is equal to or less than the in-device snapshot holding number (step 1405: No) and when all the excess snapshots have been uploaded (step 1406: Yes), the processing proceeds to step 1408.

In step 1408, the backup schedule program 506 refers to the snapshot pair management table 504. Then, it is determined whether there is a snapshot that is older than the base snapshot or exceeds the protection period (current time−acquisition time≥protection period) (step 1409). As a result of the determination, if there is no corresponding snapshot (step 1409: No), the processing is ended. On the other hand, if there is a corresponding snapshot (step 1409: Yes), the snapshot deletion processing is executed (step 1410), and the processing returns to step 1408.

Figure 15:
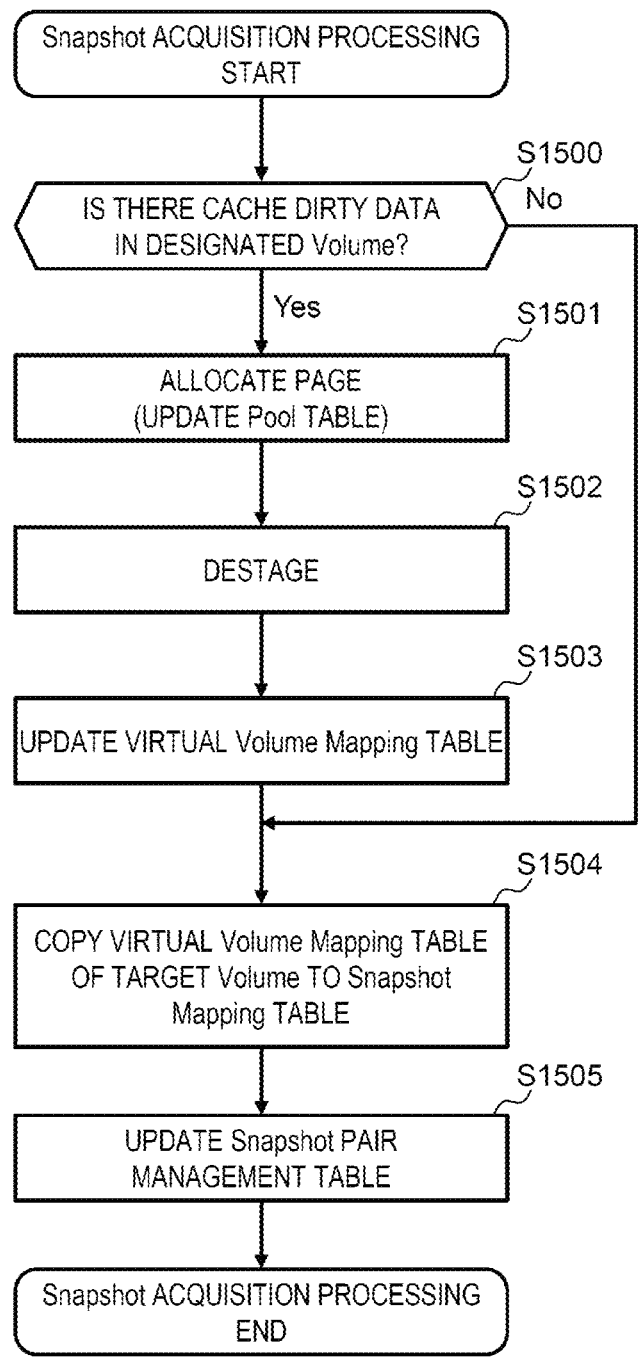
FIG. 15 is a flowchart showing a processing procedure of snapshot acquisition processing.

FIG. 15 is a flowchart showing a processing procedure of the snapshot acquisition processing. When the snapshot acquisition processing is started, the snapshot acquisition program 507 determines whether cache dirty data is present in a designated volume (step 1500).

If cache dirty data is present in the designated volume (step 1500; Yes), the snapshot acquisition program 507 allocates a page to update the pool table (step 1501), destages the cache dirty data of the designated volume (step 1502), and updates a virtual volume mapping table (step 1503).

After step 1503 or when no cache dirty data is present in the designated volume (step 1500: No), the snapshot acquisition program 507 copies the virtual volume mapping table 502 of a target volume to the snapshot mapping table 503 (step 1504). Thereafter, the snapshot pair management table 504 is updated (step 1505), and the processing is ended.

Figure 16:
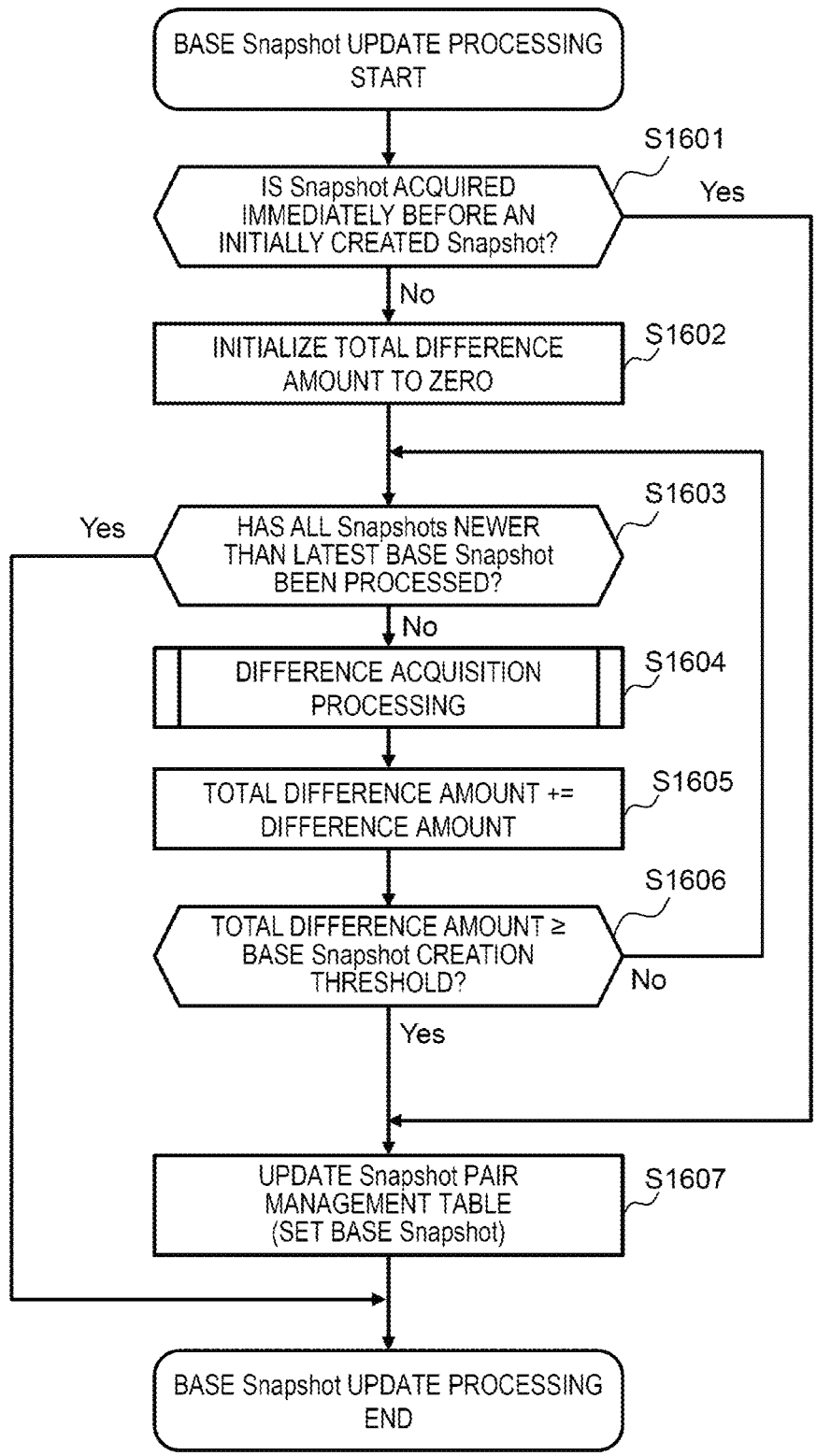
FIG. 16 is a flowchart showing details of base snapshot update processing.

FIG. 16 is a flowchart showing details of the base snapshot update processing. When the base snapshot update processing is started, the backup schedule program 506 determines whether the snapshot acquired immediately before is an initial snapshot (step 1601).

When the snapshot acquired immediately before is not the initial snapshot (step 1601: No), the snapshot acquisition program 507 initializes a total difference amount to zero (step 1602).

After step 1602, the snapshot acquisition program 507 determines whether difference acquisition processing has been completed for all snapshots newer than the latest base snapshot (step 1603). If the difference acquisition processing has been completed for all the snapshots newer than the latest base snapshot (step 1603: Yes), the processing is ended. On the other hand, if an unprocessed snapshot is left (step 1603: No), the difference acquisition processing is executed (step 1604), and a difference amount is added to the total difference amount (step 1605). After step 1605, the processing returns to step 1603.

After step 1605, the backup schedule program 506 determines whether the total difference amount is equal to or greater than the base snapshot creation threshold (step 1606). As a result of the determination, when the total difference amount is less than the base snapshot creation threshold (step 1606: No), the processing returns to step S1603.

When the total difference amount is equal to or greater than the base snapshot creation threshold (step 1606: Yes) or when the snapshot acquired immediately before is the initial snapshot (step 1601: Yes), the backup schedule program 506 updates the snapshot pair management table 504 to set the base snapshot (step 1607), and ends the processing.

Figure 17:
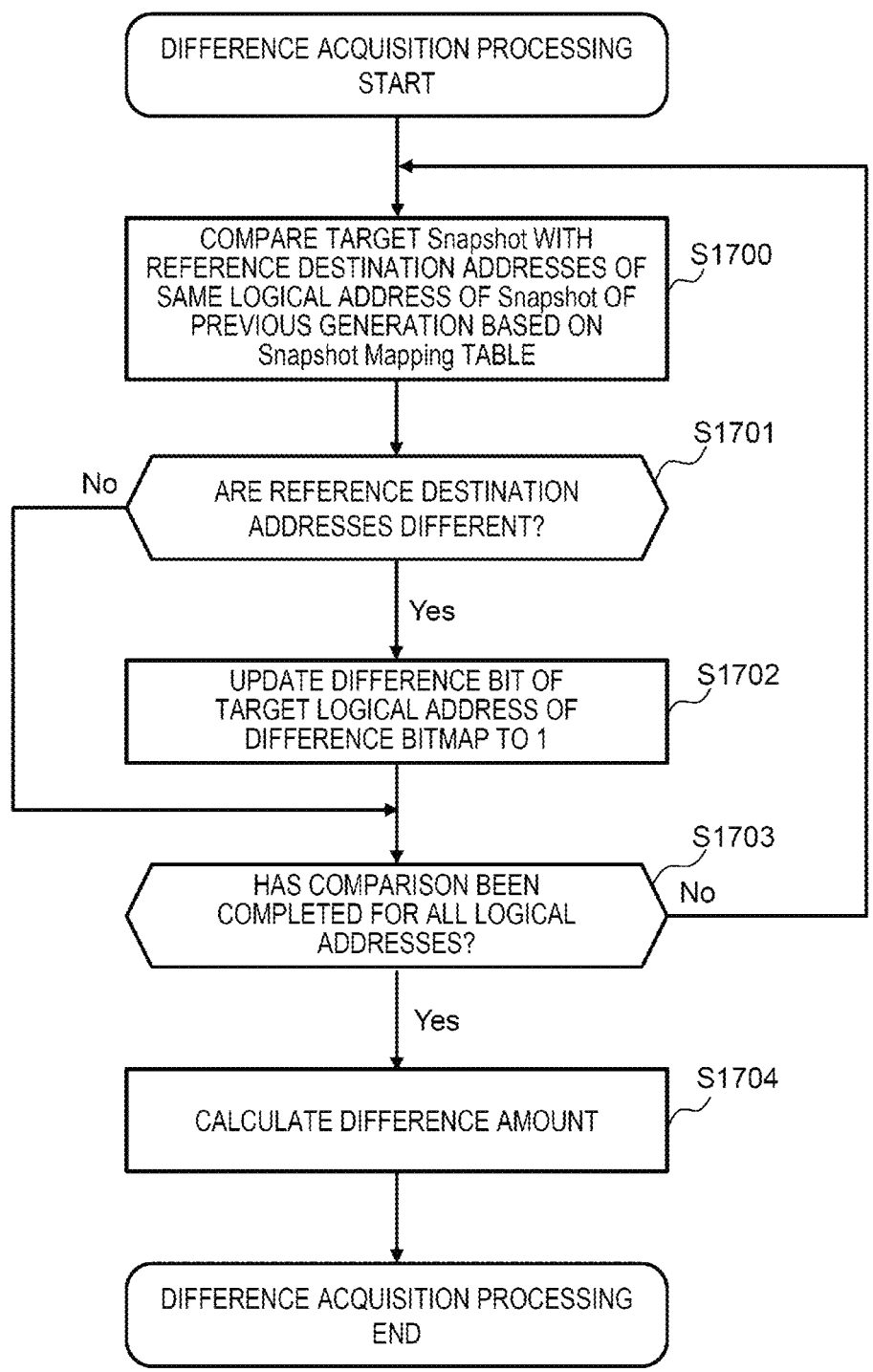
FIG. 17 is a flowchart showing details of difference acquisition processing.

FIG. 17 is a flowchart showing details of the difference acquisition processing. When the difference acquisition processing is started, the difference acquisition program 509 uses the snapshot mapping table 503 to compare a target snapshot with reference destination addresses of the same logical address of the snapshot of the previous generation (step 1700).

As a result of the comparison, if the reference destination addresses are different (step 1701: Yes), the difference acquisition program 509 updates a difference bit of a target logical address of the difference bitmap 505 to "1" (step 1702).

After step 1702 or when the reference destination addresses are the same (step 1701: No), the difference acquisition program 509 determines whether the comparison has been completed for all the logical addresses (step 1703).

If a logical address for which the comparison has not been completed is left (step 1703: No), the processing returns to step 1700. If the comparison has been completed for all the logical addresses (step 1703: Yes), the difference acquisition program 509 calculates the difference amount (step 1704), and ends the processing. The difference amount may be calculated using a number at which the difference bit of the difference bitmap becomes 1.

Figure 18:
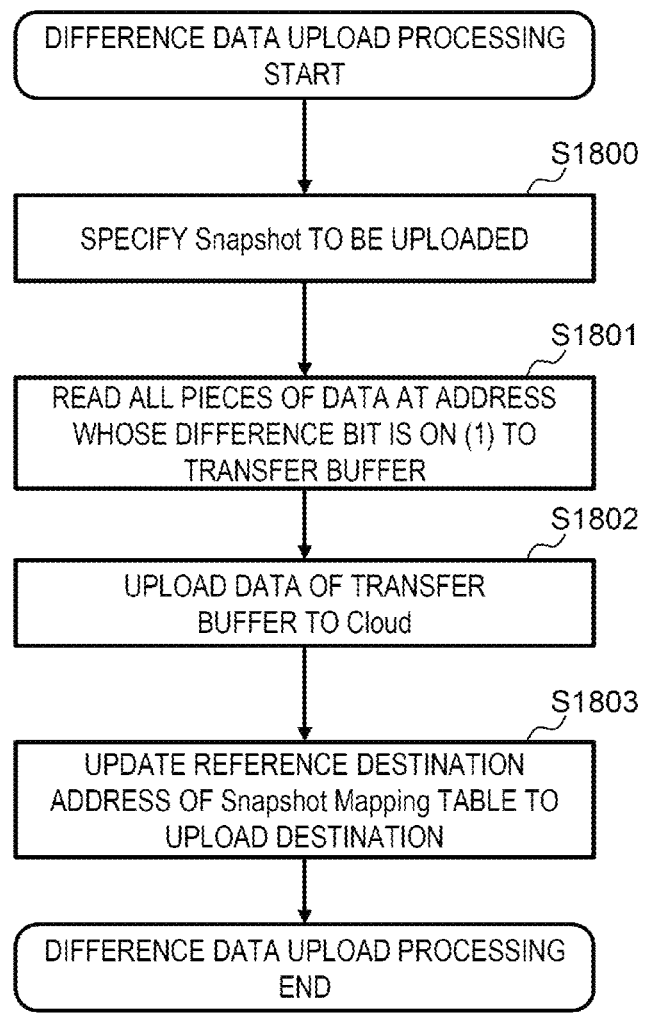
FIG. 18 is a flowchart showing details of difference data upload processing.

FIG. 18 is a flowchart showing details of the difference data upload processing. When the difference data upload processing is started, the difference data upload program 510 specifies a snapshot to be uploaded (step 1800). If a plurality of snapshots to be uploaded are present, the snapshot to be uploaded is specified from the oldest snapshot.

After step 1800, the difference data upload program 510 reads all pieces of data at the address whose difference bit is "1" to a transfer buffer (step 1801). Then, the data of the transfer buffer is uploaded to the cloud (step 1802), the reference destination address of the snapshot mapping table 503 is updated to an upload destination (step 1803), and the processing is ended. As a result of updating the reference destination address to the upload destination, data that is not referred to from all the snapshots becomes invalidated data that is not used in the on-premises. The data invalidated in this way can be released, and the capacity of the on-premises can be saved by the release.

Figure 19:
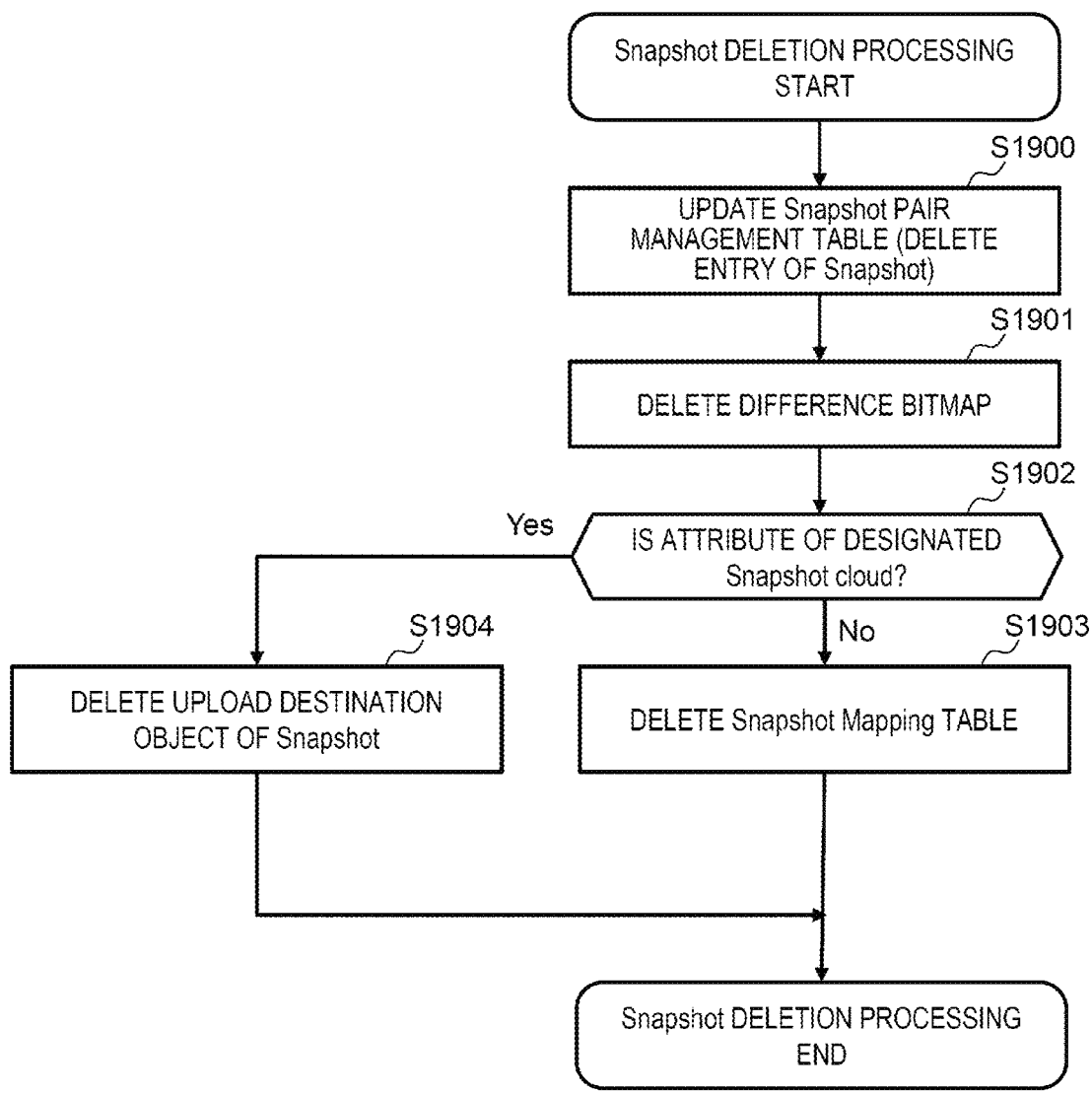
FIG. 19 is a flowchart showing details of snapshot deletion processing.

FIG. 19 is a flowchart showing details of the snapshot deletion processing. When the snapshot deletion processing is started, the snapshot deletion program 512 updates the snapshot pair management table 504, and deletes an entry of a snapshot to be deleted (step 1900).

After step 1900, the snapshot acquisition program 507 deletes the difference bitmap (step 1901), and determines whether an attribute of a designated snapshot is cloud (step 1902).

If the attribute of the designated snapshot is cloud (step 1902: Yes), an upload destination object of the snapshot is deleted (step 1904), and the processing is ended.

If the attribute of the designated snapshot is not cloud (step 1902: No), the snapshot deletion program 512 deletes the corresponding snapshot mapping table 503 (step S1903), and ends the processing.

Figure 20:
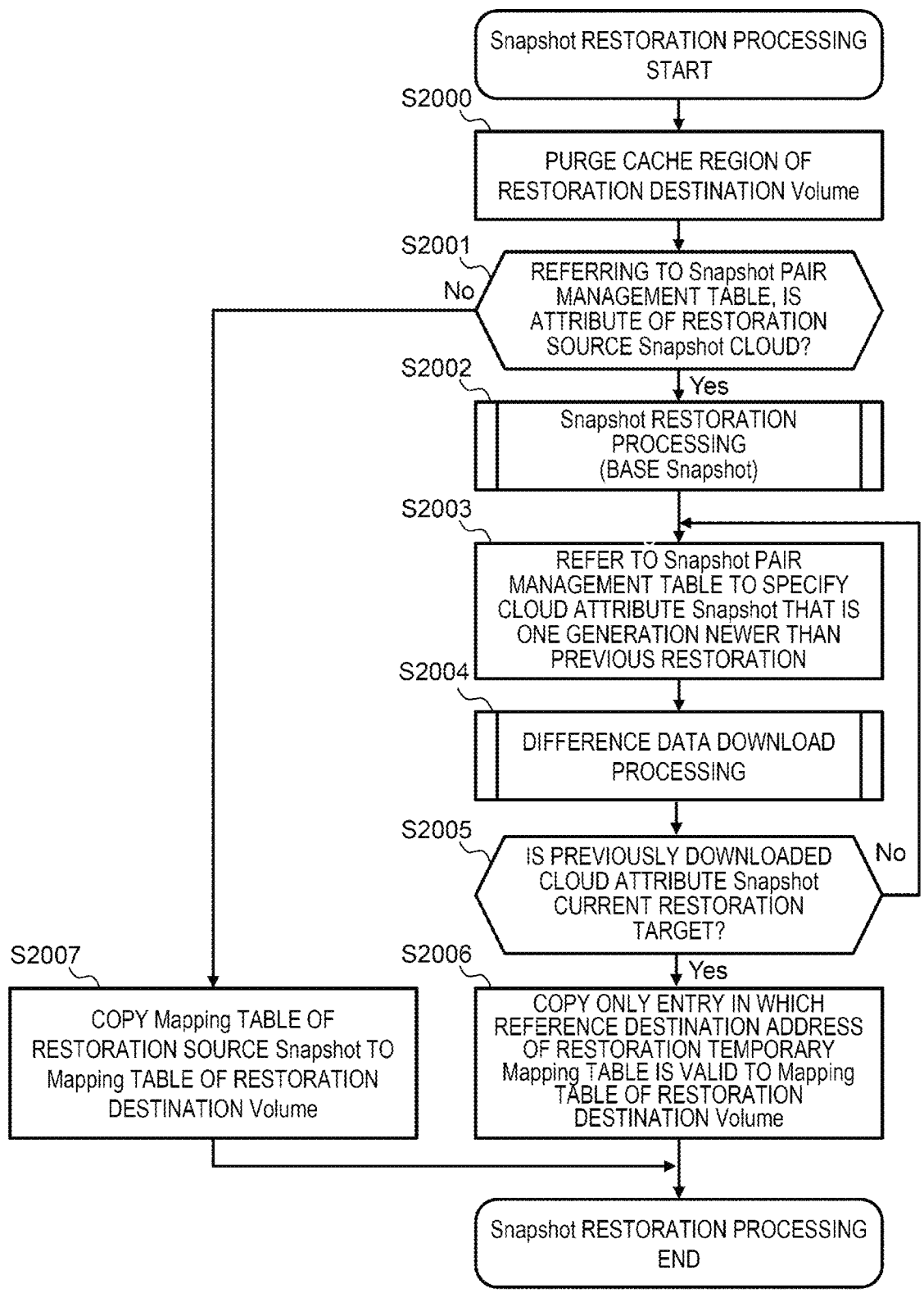
FIG. 20 is a flowchart showing a processing procedure of snapshot restoration processing.

FIG. 20 is a flowchart showing a processing procedure of snapshot restoration processing. The snapshot restoration program 508 first purges a cache region of a restoration destination volume (step 2000). Thereafter, the snapshot pair management table 504 is referred to, and it is determined whether an attribute of a restoration source snapshot is cloud (step 2001).

If the attribute of the restoration source snapshot is not cloud (step 2001: No), write back is executed to copy a mapping table of the restoration source snapshot to a mapping table of the restoration destination volume (step 2007), and the processing is ended.

If the attribute of the restoration source snapshot is cloud (step 2001: Yes), the snapshot restoration program 508 executes the snapshot restoration processing for the base snapshot (step 2002). When step 2000 and step 2001 are executed for the base snapshot, since a determination result of step 2001 is No, step 2007 is executed and the processing is ended.

After completing the restoration processing (step 2002) for the base snapshot, the snapshot restoration program 508 refers to the snapshot pair management table 504 to specify a cloud attribute snapshot that is one generation newer than the previous restoration (step 2003).

The snapshot restoration program 508 executes difference data download processing for the specified cloud attribute snapshot (step 2004), and determines whether the previously downloaded cloud attribute snapshot is a current restoration target (step 2005).

When the previously downloaded cloud attribute snapshot is not the current restoration target (step 2005: No), that is, when the previously downloaded cloud attribute snapshot has not reached a snapshot to be restored this time, the processing returns to step 2003, and a next generation cloud attribute snapshot is specified.

When the previously downloaded cloud attribute snapshot is the current restoration target (step 2005: Yes), that is, when the previously downloaded cloud attribute snapshot has reached the snapshot to be restored this time, the snapshot restoration program 508 reflects only an entry in which a reference destination address of a restoration temporary mapping table is valid by copying the entry to the mapping table of the restoration destination volume (step 2006), and ends the snapshot restoration processing.

Figure 21:
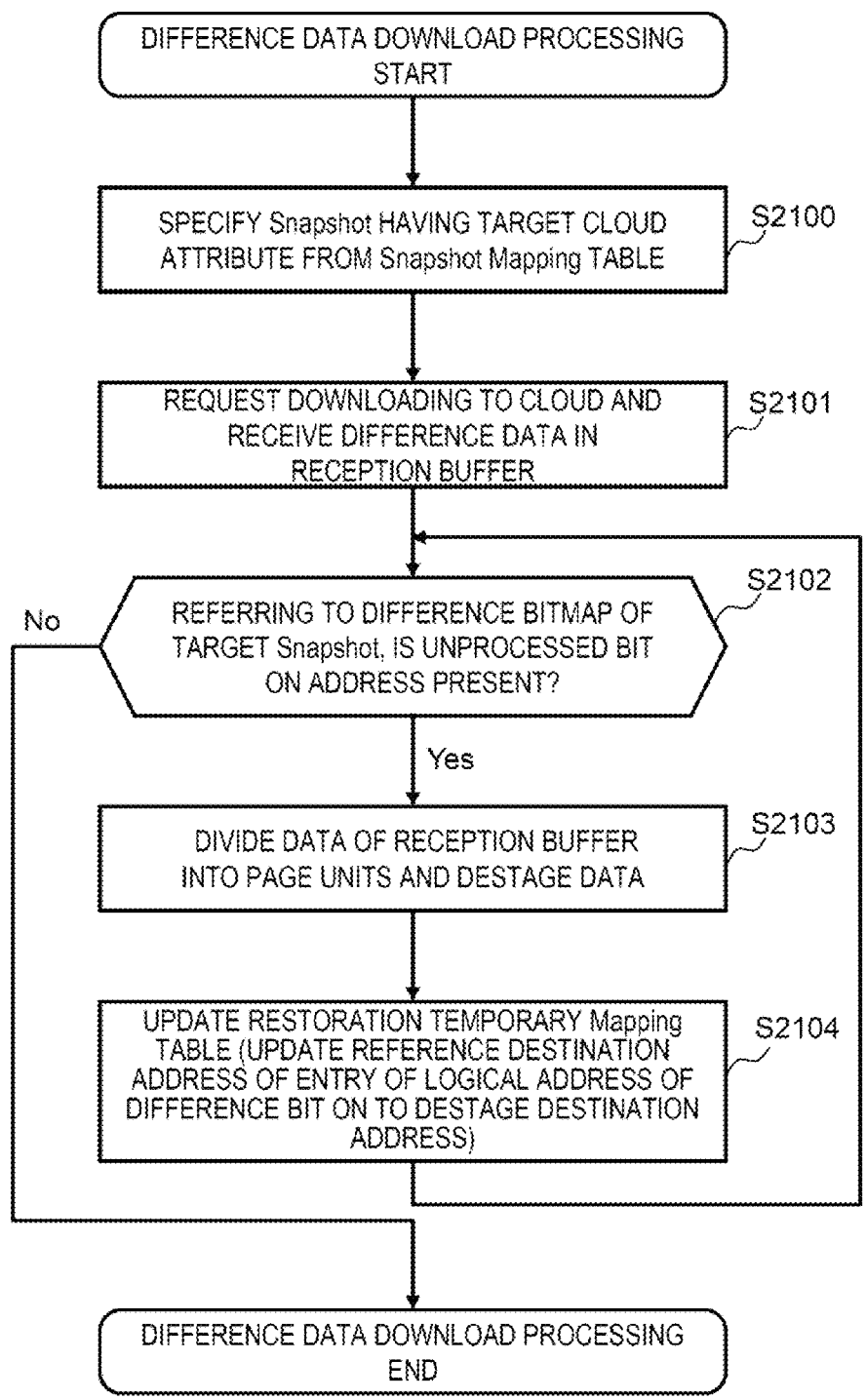
FIG. 21 is a flowchart showing details of difference data download processing.

FIG. 21 is a flowchart showing details of the difference data download processing. When the difference data download processing is started, the difference data download program 511 specifies a snapshot having a target cloud attribute from the snapshot mapping table 503 (step 2100). Then, downloading is requested to the cloud, and the difference data is received in a reception buffer (step 2101).

After step 2101, the difference data download program 511 refers to a difference bitmap of a target snapshot, and determines whether an unprocessed bit on (difference bit "1") address is present (step 2102).

If an unprocessed bit on address is present (step 2102: Yes), the difference data download program 511 divides the data of the reception buffer into page units and destages the data (step 2103). Thereafter, the difference data download program 511 updates a logical address of a difference bit on to a destage destination address by updating the restoration temporary mapping table (step 2104), and the processing returns to step 2102.

If no unprocessed bit on address is present (step 2102: No), the processing is ended.

Second Embodiment

In the first embodiment, a configuration has been described in which an on-premises storage system acquires a plurality of pieces of difference data held in a cloud, and applies the plurality of pieces of difference data in on-premises in time series to execute restoration. In the second embodiment, a configuration will be described in which a storage system of a cloud integrates a plurality of pieces of difference data to generate difference merge data, and an on-premises storage system acquires and applies the difference merge data.

Figure 22:
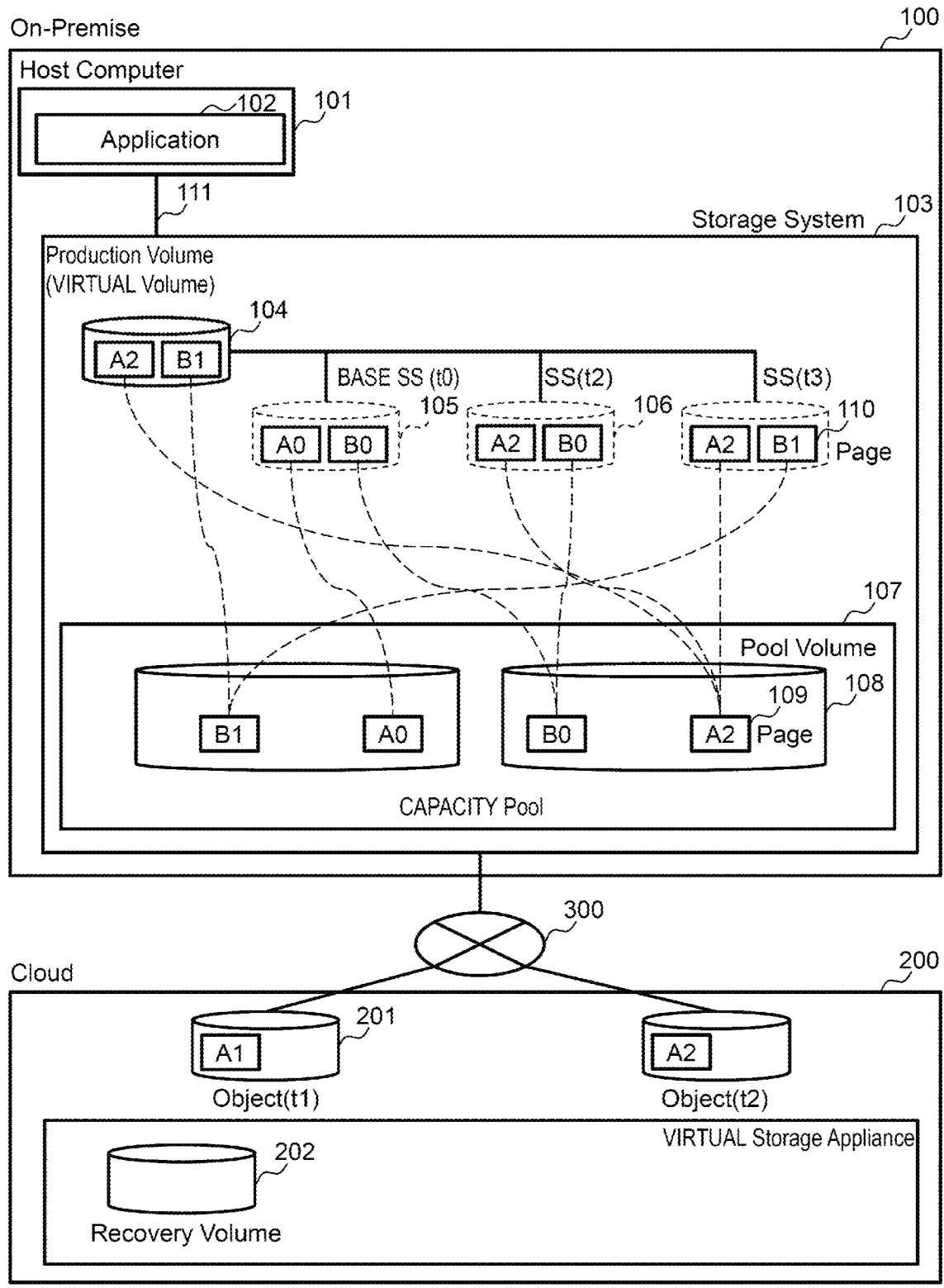
FIG. 22 is a configuration diagram of a computer system according to a second embodiment.

FIG. 22 is a configuration diagram of a computer system according to the second embodiment.

The computer system according to the present embodiment is different from the first embodiment in that a recovery volume 202 including a virtual storage is provided.

In the present embodiment, a plurality of pieces of difference data stored in the object storage 201 of the cloud 200 are integrated on the recovery volume 202, and the resulting difference merge data is transmitted to the on-premises storage system 103.

Since other configurations and operations are the same as those according to the first embodiment, the same components are denoted by the same reference numerals, and the description thereof is omitted.

Figure 23:
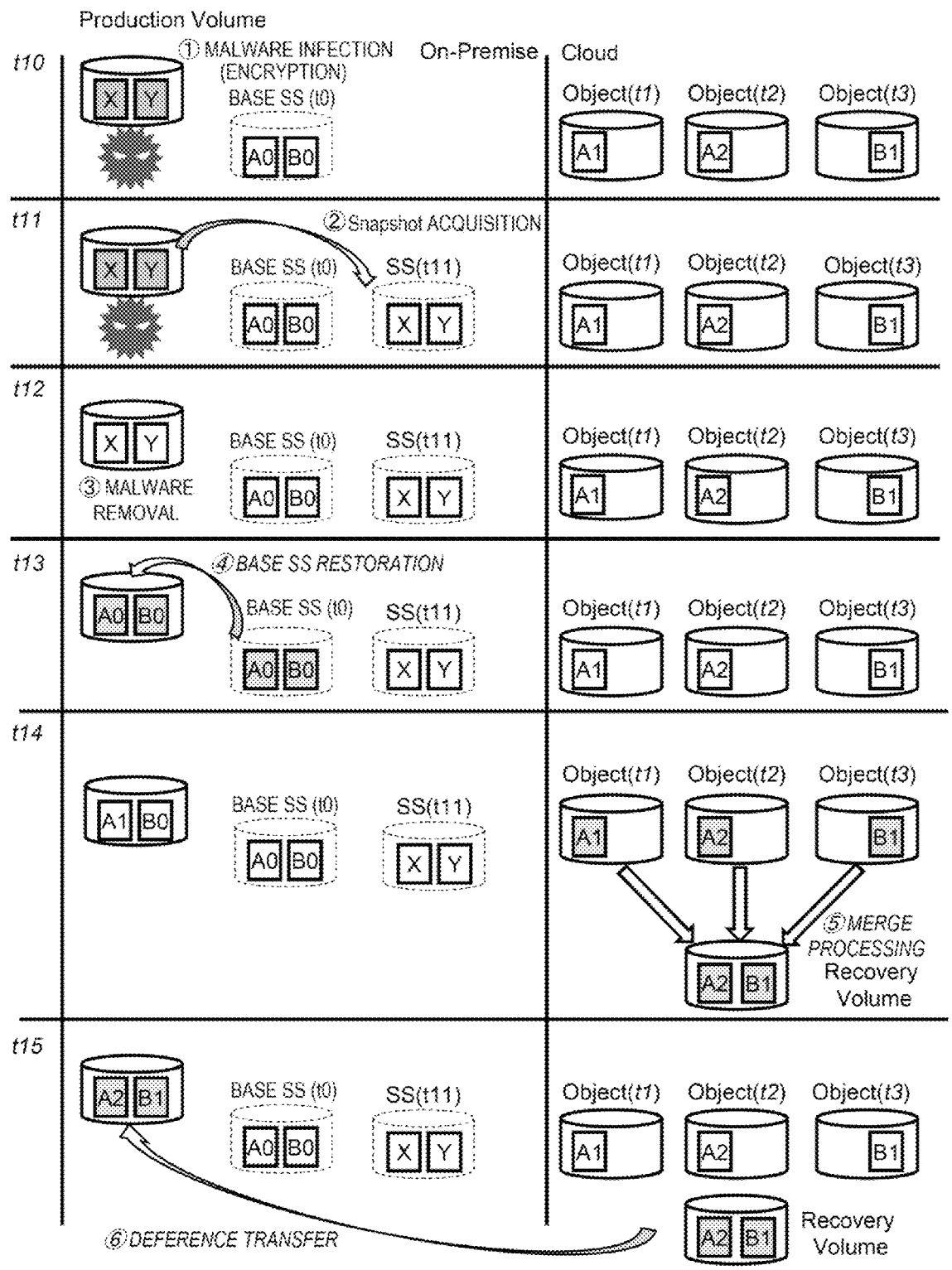
FIG. 23 is an explanatory diagram of restoration according to the second embodiment.

FIG. 23 is an explanatory diagram of restoration according to the second embodiment. Since the processing from the time (t10) to the time (t13) are the same as those according to the first embodiment, the description thereof will be omitted.

At the time (t14) in the second embodiment, merge processing for integrating objects is executed in the cloud. As a result, the data A2 and the data B1 are included in the recovery volume of the cloud.

At the time (t15), the on-premises storage system receives difference transfer of the difference merge data obtained by the integration, and reflects the difference transfer on the production volume. As a result, the data A2 and the data B1 are included in the production volume.

In this way, after the base snapshot held in the on-premises has been written back, the restoration of the production volume can be executed by applying the difference merge data integrated by the cloud.

As compared with FIG. 2 in the first embodiment, since change from the data A1 to the data A2 is reflected by the cloud and then is transmitted to the on-premises, the data A1 is not transferred from the cloud to the on-premises, so that the transfer amount is reduced.

Figure 24:
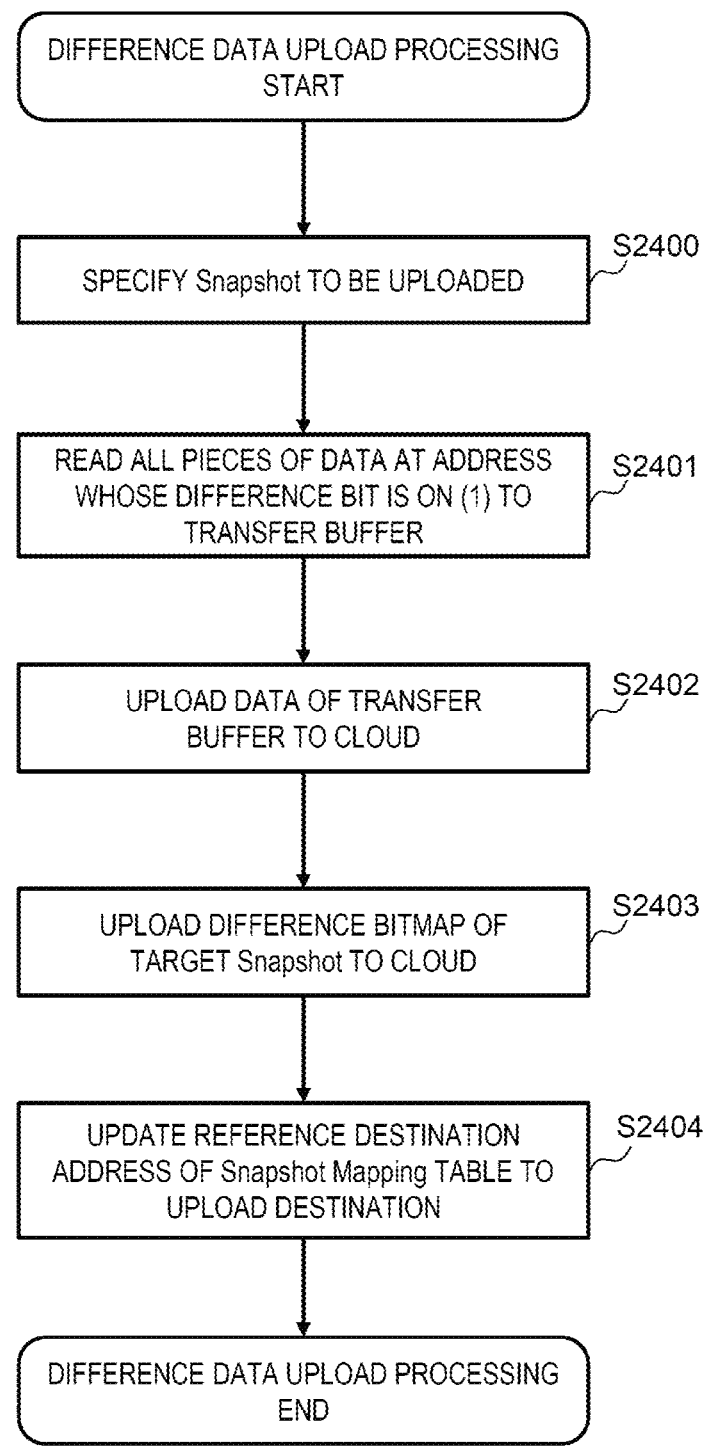
FIG. 24 is a flowchart showing details of difference data upload processing according the second embodiment.

FIG. 24 is a flowchart showing details of difference data upload processing according the second embodiment. When the difference data upload processing is started, the difference data upload program 510 specifies a snapshot to be uploaded (step 2400). If a plurality of snapshots to be uploaded are present, the snapshot to be uploaded is specified from the oldest snapshot.

After step 2400, the difference data upload program 510 reads all pieces of data at an address whose difference bit is "1" to a transfer buffer (step 2401). Then, the data of the transfer buffer is uploaded to the cloud (step 2402), and the difference bitmap 505 of the target snapshot is uploaded to the cloud (step 2403). This is because the data of the transfer buffer and the difference bitmap 505 are necessary when the difference data is merged in the cloud. Thereafter, the difference data upload program 510 updates a reference destination address of the snapshot mapping table 503 to an upload destination (step 2404), and ends the processing.

Figure 25:
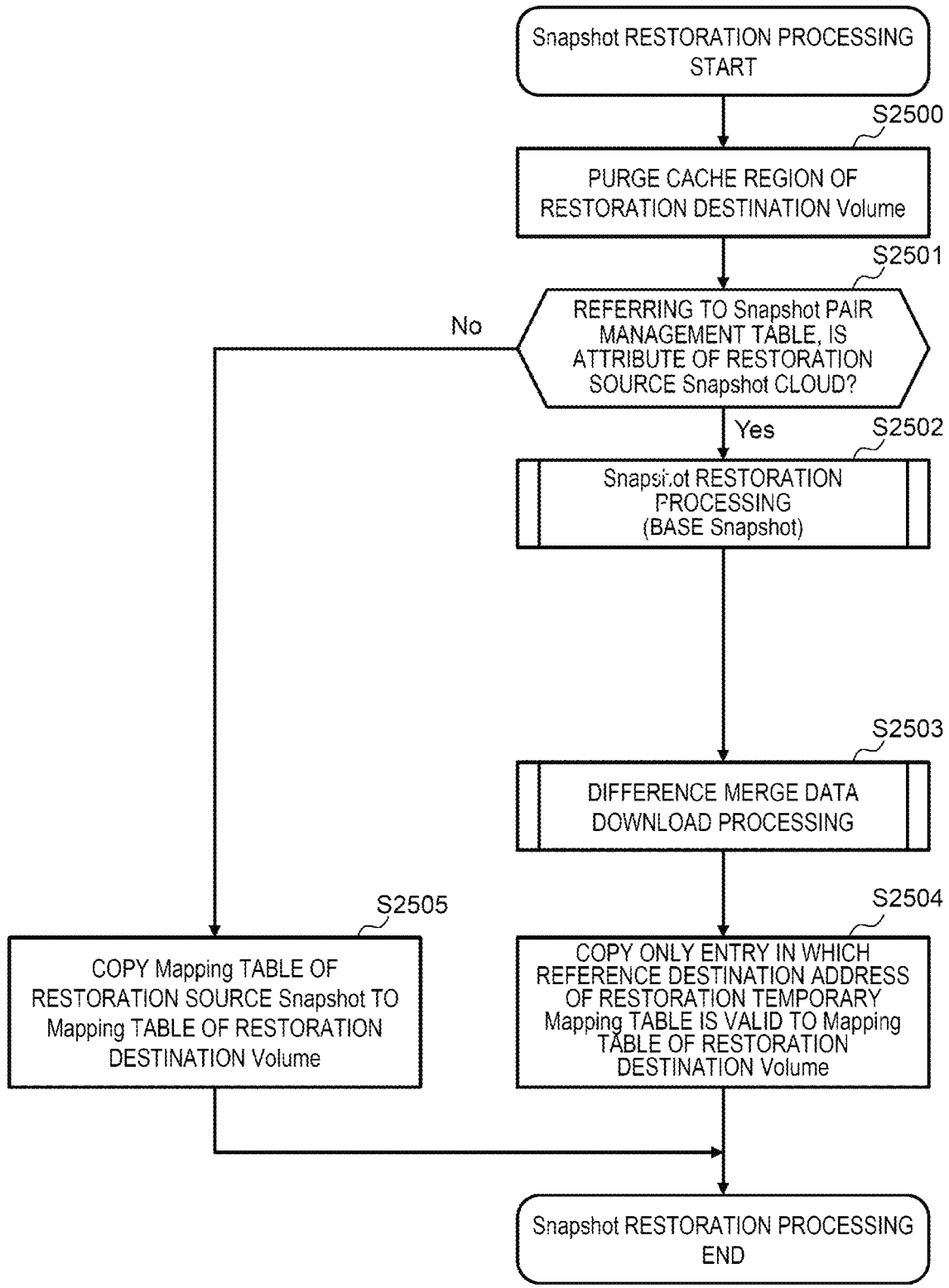
FIG. 25 is a flowchart showing a processing procedure of snapshot restoration processing according to the second embodiment.

FIG. 25 is a flowchart showing a processing procedure of snapshot restoration processing according to the second embodiment. In FIG. 25, instead of step 2003 to step 2005 shown in FIG. 20, difference merge data download processing in step 2500 is executed. Other processing is the same as those in FIG. 20.

Specifically, step 2500 and step 2501 correspond to step 2000 and step 2001, step 2505 corresponds to step 2007, and step 2504 corresponds to step 2006.

Figure 26:
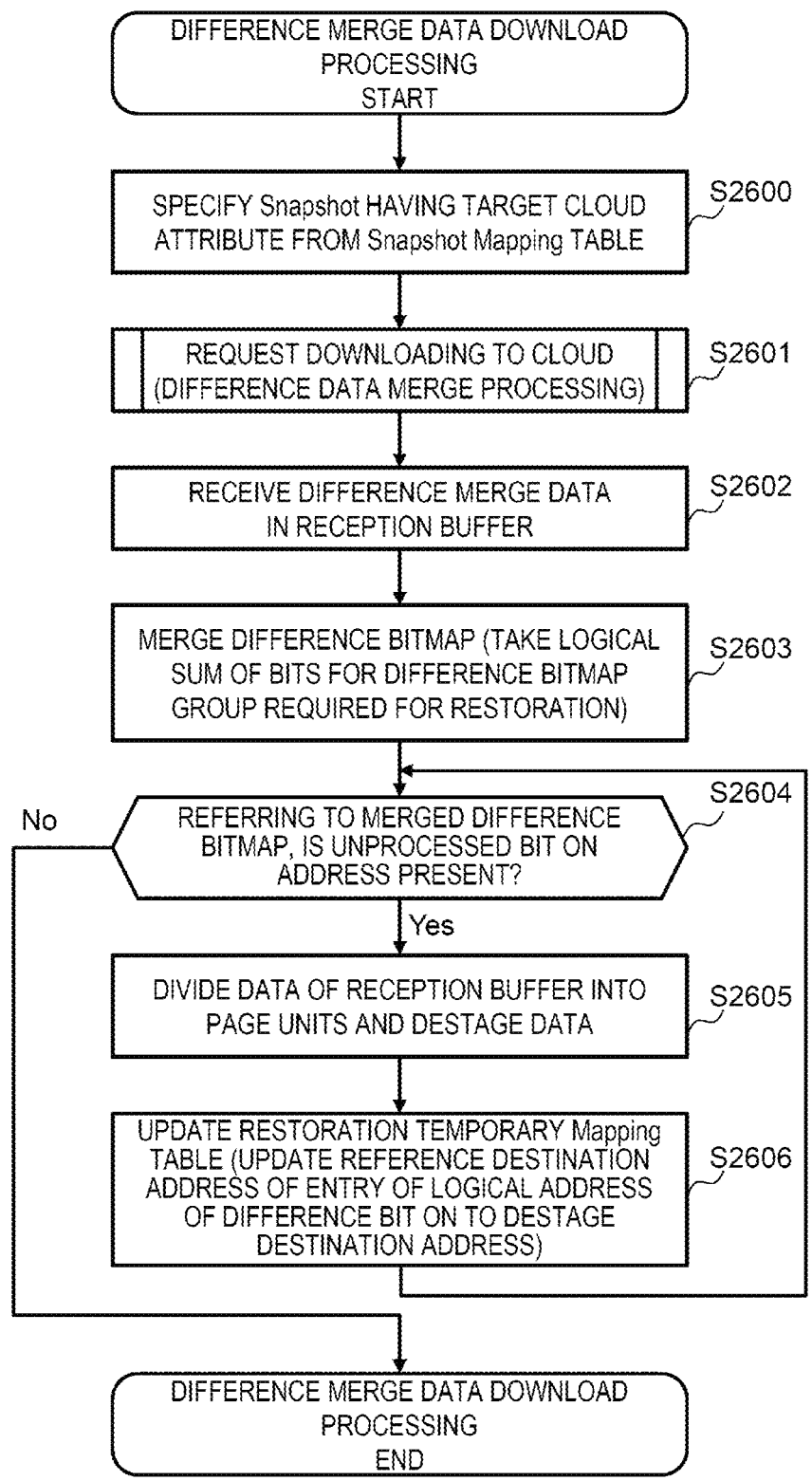
FIG. 26 is a flowchart showing details of difference merge data download processing.

FIG. 26 is a flowchart showing details of the difference merge data download processing. When the difference merge data download processing is started, the difference data download program 511 specifies a snapshot having a target cloud attribute from the snapshot mapping table 503 (step 2600), and requests downloading to the cloud (step 2601). In the cloud, difference data merge processing described later is executed, and the difference merge data is transferred to the on-premises.

The difference data download program 511 receives the difference merge data in a reception buffer (step 2602), and merges a difference bitmap (step 2603). In the merging of the difference bitmap, processing of taking a logical sum of bits is executed on a difference bitmap group required for the restoration.

After step 2603, the difference data download program 511 refers to a difference bitmap of a target snapshot, and determines whether an unprocessed bit on (difference bit "1") address is present (step 2604).

If an unprocessed bit on address is present (step 2604: Yes), the difference data download program 511 divides the data of the reception buffer into page units and destages the data (step 2605). Thereafter, the difference data download program 511 updates a logical address of a difference bit on to a destage destination address by updating a restoration temporary mapping table (step 2606), and the processing returns to step 2604.

If no unprocessed bit on address is present (step 2604: No), the processing is ended.

Figure 27:
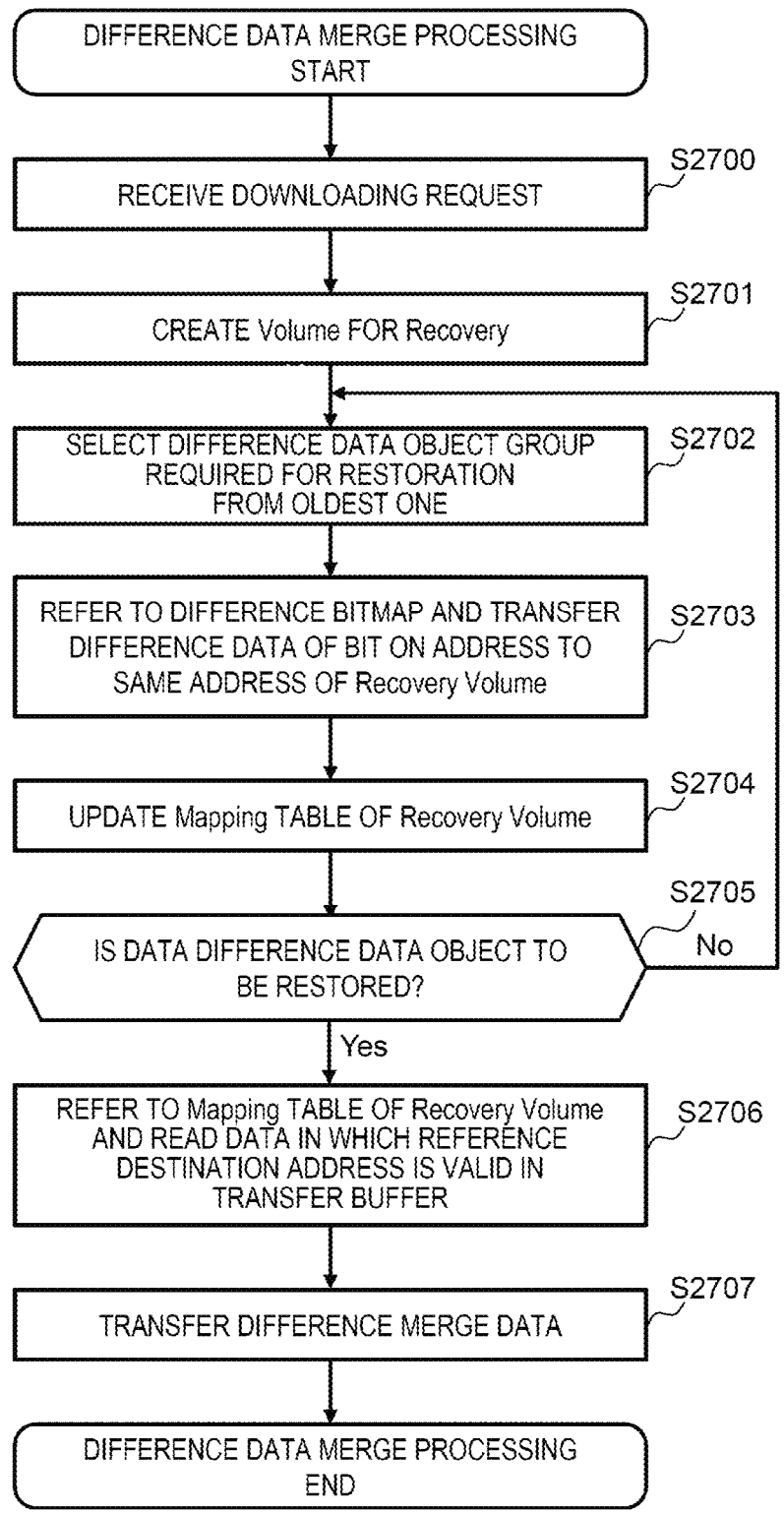
FIG. 27 is a flowchart showing details of difference data merge processing in a cloud.

FIG. 27 is a flowchart showing details of difference data merge processing in the cloud. A virtual storage system of the cloud receives the downloading request from the on-premises (step 2700), and creates a volume for recovery (step 2701).

After step 2701, the virtual storage system selects a difference data object group required for the restoration from the oldest one (step 2702). The virtual storage system refers to the difference bitmap, transfers difference data of the difference bit on address to the same address of the recovery volume (step 2703), and updates a mapping table of the recovery volume (step 2704).

After step 2704, the virtual storage system determines whether data is a difference data object to be restored, that is, whether a snapshot to be restored this time has been reached (step 2705).

When the data is not the difference data object to be restored (step 2705; No), the processing returns to step 2702.

When the data is the difference data object to be restored (step 2705: Yes), the virtual storage system refers to the mapping table of the recovery volume, and reads data in which the reference destination address is valid in the transfer buffer (step 2706). Then, the data read to the transfer buffer is transferred as the difference merge data (step 2707), and the processing is ended.

Next, a modification of the system configuration will be described.

Figure 28:
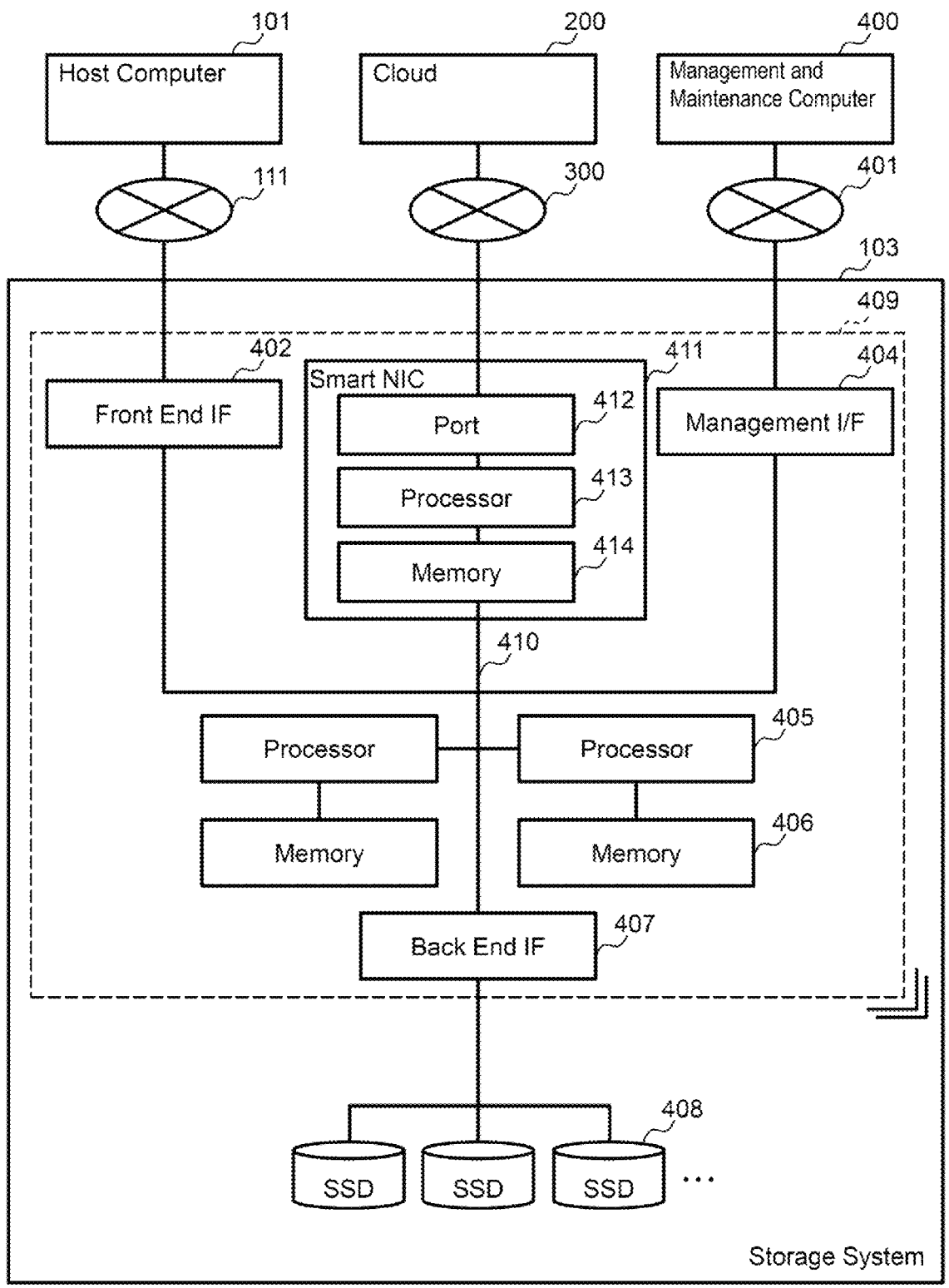
FIG. 28 is a configuration diagram of a storage system according to a modification.

FIG. 28 is a configuration diagram of the storage system 103 according to the modification. The configuration shown in FIG. 28 is different from the configuration shown in FIG. 4 in that a smart network interface controller (NIC) 411 is provided instead of the external transfer IF 403.

The smart NIC 411 includes therein a port 412, a processor 413, and a memory 414.

Figure 29:
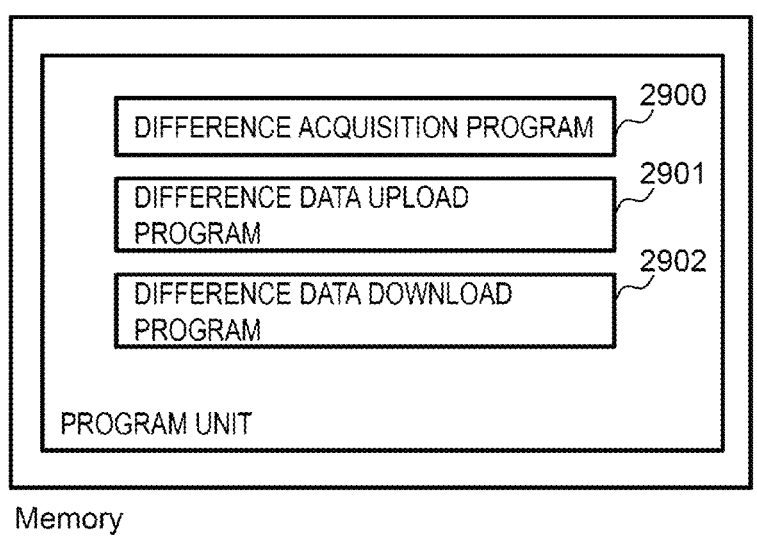
FIG. 29 is an explanatory diagram of data stored in a memory according to the modification.

As shown in FIG. 29, the memory 414 stores a difference acquisition program 2900, a difference data upload program 2901, and a difference data download program 2902.

The processor 413 executes processing related to communication of the difference data by executing these programs. Therefore, the processor 405 does not need to execute the processing related to the communication of the difference data, and may process reading and writing on the virtual volume.

Since other configurations and operations are the same as those in FIG. 4, the same components are denoted by the same reference numerals, and the description thereof is omitted.

As described above, the disclosed storage system 103 is a storage system connected to the cloud 200, which is another storage system, via a network. The storage system 103 includes the memory 406 (or 414), the processor 405 (or 413) that executes a program stored in the memory, and the physical storage device 408 as a storage device. By executing the program, the processor provides the virtual volume 104, generates a plurality of snapshots at different timings for the virtual volume 104, holds a base snapshot, which is a reference snapshot among the plurality of snapshots, in the storage device, and transmits difference data indicating a difference between a snapshot generated after the base snapshot and a snapshot generated immediately before the snapshot to the other storage system and holds the difference data in the other storage system.

With such a configuration and operation, the storage system 103 can reduce the data transfer amount between the storage systems.

When executing restoration of the virtual volume, the processor writes the base snapshot back to the virtual volume, and then executes processing of reflecting the difference data acquired from the other storage system on the virtual volume.

Therefore, it is sufficient to transfer only the difference data at the time of the restoration, and the transfer amount can be reduced.

The processor holds the latest snapshot transferred to the other storage system in the storage device, and invalidates data of another snapshot generated between the base snapshot and the latest snapshot.

Therefore, the capacity of the on-premises can be reduced.

The processor updates the base snapshot when a predetermined condition is satisfied.

Therefore, it is possible to limit an increase in data amount of the on-premises due to accumulation of the difference data.

As disclosed in the first embodiment, the processor can execute the restoration by applying, in time series, a plurality of pieces of difference data corresponding to the plurality of snapshots generated at the different timings.

As disclosed in the second embodiment, the processor can receive difference merge data obtained by integrating a plurality of pieces of difference data corresponding to the plurality of snapshots generated at the different timings from the other storage system, and can reflect the difference merge data on the virtual volume to which the base snapshot is written back to execute the restoration.

As disclosed in the modification, since the processor includes a first processor that processes reading and writing on the virtual volume, and a second processor that executes processing related to communication of the difference data, load on the processor may be distributed.

The invention is not limited to the above embodiments, and includes various modifications. For example, the embodiments described above have been described in detail for easy understanding of the invention, and the invention is not necessarily limited to those including all of the configurations described above. The configuration is not limited to being deleted, and the configuration may be replaced or added.

What is claimed is:

1. A storage system connected to an other storage system via a network, the storage system comprising:
   a memory;
   a processor configured to execute a program stored in the memory; and
   a storage device, wherein
   by executing the program, the processor
      provides a virtual volume,
      generates a plurality of snapshots at different timings for the virtual volume, wherein each of the plurality of snapshots includes at least a first data and a second data,
      holds a base snapshot, which is a reference snapshot among the plurality of snapshots, in the storage device, and includes first data and second data,
      a first snapshot, generated at a timing after the base snapshot, updates the first data to first data one,
      a second snapshot, generated at a timing after the first snapshot, updates the first data one to first data two,
      a third snapshot, generated at a timing after the second snapshot, maintains the first data two and updates the second data to second data one, determines a first difference data between the base snapshot and the first snapshot and transmits the first difference data to a volume in the other storage system, determines a second difference data between the first snapshot and the second snapshot and transmits the second difference data to a different volume in the other storage system, and deletes the first snapshot from the storage system and holds the first difference data and the second difference data in the other storage system.

2. The storage system according to claim 1, wherein when executing restoration of the virtual volume, the processor writes the base snapshot back to the virtual volume, and then executes processing of reflecting difference data acquired from the other storage system on the virtual volume.

3. The storage system according to claim 1, wherein the processor holds a latest snapshot transferred to the other storage system in the storage device, and invalidates data of another snapshot generated between the base snapshot and the latest snapshot.

4. The storage system according to claim 1, wherein the processor updates the base snapshot when a predetermined condition is satisfied.

5. The storage system according to claim 2, wherein the processor executes the restoration by applying, in time series, a plurality of pieces of difference data corresponding to the plurality of snapshots generated at different timings.

6. The storage system according to claim 2, wherein the processor receives difference merge data obtained by integrating a plurality of pieces of difference data corresponding to the plurality of snapshots generated at the different timings from the other storage system, and reflects the difference merge data on the virtual volume to which the base snapshot is written back to execute the restoration.

7. The storage system according to claim 1, wherein the processor includes a first processor configured to process reading and writing on the virtual volume, and a second processor configured to execute processing related to communication of difference data.

8. A computer system comprising:

a first storage system; and a second storage system connected to the first storage system via a network, wherein the first storage system provides a virtual volume, generates a plurality of snapshots at different timings for the virtual volume, wherein each of the plurality of snapshots includes at least a first data and a second data holds a base snapshot, which is a reference snapshot among the plurality of snapshots, in the storage device, and includes first data and second data, a first snapshot, generated at a timing after the base snapshot, updates the first data to first data one, a second snapshot, generated at a timing after the first snapshot, updates the first data one to first data two, a third snapshot, generated at a timing after the second snapshot, maintains the first data two and updates the second data to second data one, determines a first difference data between the base snapshot and the first snapshot and transmits the first difference data to a volume in the other storage system, determines a second difference data between the first snapshot and the second snapshot and transmits the second difference data to a different volume in the other storage system, and deletes the first snapshot from the storage system and holds the first difference data and the second difference data in the second storage system.

9. The computer system according to claim 8, wherein the second storage system holds a plurality of pieces of difference data corresponding to the plurality of snapshots, and transmits the plurality of pieces of difference data to the first storage system when executing restoration of the virtual volume, and the first storage system writes the base snapshot back to the virtual volume, and then executes the restoration by applying, in time series, the plurality of pieces of difference data received from the second storage system.

10. The computer system according to claim 8, wherein the second storage system holds a plurality of pieces of difference data corresponding to the plurality of snapshots, and transmits difference merge data obtained by integrating the plurality of pieces of difference data to the first storage system when executing restoration of the virtual volume, and the first storage system writes the base snapshot back to the virtual volume, and then reflects the difference merge data to execute the restoration.

11. A control method for a first storage system connected to a second storage system via a network, the control method comprising:

providing a virtual volume;

generating a plurality of snapshots at different timings for the virtual volume, wherein each of the plurality of snapshots includes at least a first data and a second data;

holding a base snapshot, which is a reference snapshot among the plurality of snapshots, in the first storage system, and includes first data and second data;

generating a first snapshot at a timing after the base snapshot to update the first data to first data one;

generating a second snapshot at a timing after the first snapshot to update the first data one to first data two;

generating a third snapshot at a timing after the second snapshot to maintain the first data two and update the second data to second data one;

determining a first difference data between the base snapshot and the first snapshot and transmitting the first difference data to a volume in the other storage system;

determining a second difference data between the first snapshot and the second snapshot and transmitting the second difference data to a different volume in the other storage system; and deleting the first snapshot from the storage system and holding the first difference data and the second difference data the second storage system.

12. The storage system according to claim 1, wherein on a condition that a number of the plurality of snapshots in the storage system exceeds a predetermined number, the processor determines a difference between a snapshot at a timing closest to the timing of the base snapshot and an other snapshot at a timing after the snapshot, and transmits the difference to the other storage system.

* * * * *